(12) United States Patent
Gillespie et al.

(10) Patent No.: US 8,560,947 B2
(45) Date of Patent: Oct. 15, 2013

(54) TOUCH SCREEN WITH USER INTERFACE ENHANCEMENT

(75) Inventors: David W. Gillespie, Los Gatos, CA (US); Raymond A. Trent, San Jose, CA (US); Andrew C. Hsu, Belmont, CA (US); Leslie R. Grate, Waltham, MA (US)

(73) Assignee: Synaptics Incorporated, San Jose, CA (US)

( * ) Notice: Subject to any disclaimer, the term of this patent is extended or adjusted under 35 U.S.C. 154(b) by 109 days.

(21) Appl. No.: 12/777,898

(22) Filed: May 11, 2010

(65) Prior Publication Data

US 2010/0275163 A1    Oct. 28, 2010

Related U.S. Application Data

(63) Continuation of application No. 10/125,066, filed on Apr. 17, 2002, now Pat. No. 7,730,401.

(60) Provisional application No. 60/291,694, filed on May 16, 2001.

(51) Int. Cl.
*G06F 3/01*    (2006.01)
*G06F 3/00*    (2006.01)

(52) U.S. Cl.
USPC ........... 715/702; 715/764; 715/767; 715/856; 715/857; 715/858; 715/864; 345/156; 345/157; 345/173; 345/174; 345/175

(58) Field of Classification Search
USPC ................. 715/702, 864; 345/156–168, 173; 707/104.1; 463/37; 399/185; 348/14.03
See application file for complete search history.

(56) References Cited

U.S. PATENT DOCUMENTS

| | | | |
|---|---|---|---|
| 4,639,720 A | 1/1987 | Rympalski et al. |
| 4,680,577 A | 7/1987 | Straayer et al. |
| 4,733,222 A | 3/1988 | Evans |
| 4,763,356 A | 8/1988 | Day, Jr. et al. |
| 4,806,709 A | 2/1989 | Evans |

(Continued)

FOREIGN PATENT DOCUMENTS

| | | |
|---|---|---|
| DE | 19654684 A1 | 7/1998 |
| EP | 0262991 A2 | 4/1988 |

(Continued)

OTHER PUBLICATIONS

U.S. Appl. No. 10/125,066.

(Continued)

*Primary Examiner* — Steven B Theriault
(74) *Attorney, Agent, or Firm* — Ingrassia Fisher & Lorenz, P.C.

(57) ABSTRACT

The present invention is a graphical user interface in a computing device having a processor running an operating system and a display. The graphical user interface comprises a touch screen and a driver coupling the touch screen to the operating system. The driver can display a plurality of icons on the touch screen, or a plurality of screen images having at least one icon, with each of the icons associated with operations on the display and/or the touch screen. Other embodiments include the touch screen having unactivated and activated states, as well as the presence of an application programming interface that enables an application to display at least one image on the touch screen.

19 Claims, 14 Drawing Sheets

(56) References Cited

U.S. PATENT DOCUMENTS

| | | | |
|---|---|---|---|
| 5,250,929 A | 10/1993 | Hoffman et al. | |
| 5,274,363 A | 12/1993 | Koved et al. | |
| 5,305,017 A | 4/1994 | Gerpheide | |
| 5,307,055 A | 4/1994 | Baskin et al. | |
| 5,374,787 A | 12/1994 | Miller et al. | |
| 5,420,936 A | 5/1995 | Fitzpatrick et al. | |
| 5,457,289 A | 10/1995 | Huang et al. | |
| 5,521,596 A | 5/1996 | Selker et al. | |
| 5,543,588 A * | 8/1996 | Bisset et al. | 178/18.06 |
| 5,543,591 A | 8/1996 | Gillespie et al. | |
| 5,550,968 A | 8/1996 | Miller et al. | |
| 5,559,961 A | 9/1996 | Blonder | |
| 5,598,523 A | 1/1997 | Fujita | |
| 5,600,800 A | 2/1997 | Kikinis et al. | |
| 5,612,719 A | 3/1997 | Beernink et al. | |
| 5,666,113 A | 9/1997 | Logan | |
| 5,714,978 A | 2/1998 | Yamanaka et al. | |
| 5,724,069 A | 3/1998 | Chen | |
| 5,729,219 A | 3/1998 | Armstrong et al. | |
| 5,730,602 A | 3/1998 | Gierhart et al. | |
| 5,748,184 A | 5/1998 | Shieh | |
| 5,748,185 A | 5/1998 | Stephan et al. | |
| 5,761,485 A * | 6/1998 | Munyan | 715/839 |
| 5,764,218 A | 6/1998 | Della Bona et al. | |
| 5,764,222 A | 6/1998 | Shieh | |
| 5,790,104 A | 8/1998 | Shieh | |
| 5,802,199 A | 9/1998 | Pare, Jr. et al. | |
| 5,808,605 A | 9/1998 | Shieh | |
| 5,812,118 A | 9/1998 | Shieh | |
| 5,821,933 A | 10/1998 | Keller et al. | |
| 5,825,352 A | 10/1998 | Bisset et al. | |
| 5,831,664 A | 11/1998 | Wharton et al. | |
| 5,835,079 A | 11/1998 | Shieh | |
| 5,841,849 A | 11/1998 | Macor | |
| 5,844,547 A | 12/1998 | Minakuchi et al. | |
| 5,856,822 A | 1/1999 | Du et al. | |
| 5,856,824 A | 1/1999 | Shieh | |
| 5,870,083 A | 2/1999 | Shieh | |
| 5,874,948 A | 2/1999 | Shieh | |
| 5,880,411 A | 3/1999 | Gillespie et al. | |
| 5,896,126 A | 4/1999 | Shieh | |
| 5,907,327 A | 5/1999 | Ogura et al. | |
| 5,917,475 A * | 6/1999 | Kuzunuki et al. | 345/173 |
| 5,923,307 A | 7/1999 | Hogle, IV | |
| 5,943,052 A | 8/1999 | Allen et al. | |
| 5,949,643 A | 9/1999 | Batio | |
| 5,952,998 A | 9/1999 | Clancy et al. | |
| 5,966,122 A | 10/1999 | Itoh | |
| 5,995,084 A | 11/1999 | Chan et al. | |
| 6,002,395 A | 12/1999 | Wagner et al. | |
| 6,005,549 A | 12/1999 | Forest | |
| 6,028,959 A | 2/2000 | Wang et al. | |
| 6,037,929 A | 3/2000 | Ogura et al. | |
| 6,084,584 A | 7/2000 | Nahi et al. | |
| 6,104,334 A * | 8/2000 | Allport | 341/175 |
| 6,121,960 A | 9/2000 | Carroll et al. | |
| 6,144,358 A | 11/2000 | Narayanaswamy et al. | |
| 6,154,194 A | 11/2000 | Singh | |
| 6,157,373 A * | 12/2000 | Rego | 345/173 |
| 6,191,758 B1 * | 2/2001 | Lee | 345/2.2 |
| 6,209,104 B1 | 3/2001 | Jalili | |
| 6,211,856 B1 | 4/2001 | Choi et al. | |
| 6,226,237 B1 | 5/2001 | Chan et al. | |
| 6,252,563 B1 | 6/2001 | Tada et al. | |
| 6,262,717 B1 | 7/2001 | Donahue et al. | |
| 6,297,945 B1 | 10/2001 | Yamamoto | |
| 6,298,146 B1 | 10/2001 | Ilan et al. | |
| 6,298,147 B1 | 10/2001 | Ilan et al. | |
| 6,304,261 B1 | 10/2001 | Shields et al. | |
| 6,317,141 B1 * | 11/2001 | Pavley et al. | 715/732 |
| 6,327,482 B1 | 12/2001 | Miyashita | |
| 6,331,840 B1 * | 12/2001 | Nielson et al. | 345/1.1 |
| 6,337,918 B1 | 1/2002 | Holehan | |
| 6,346,935 B2 | 2/2002 | Nakajima et al. | |
| 6,348,956 B1 * | 2/2002 | Tanigawa et al. | 348/734 |
| 6,351,634 B1 | 2/2002 | Shin | |
| 6,360,004 B1 | 3/2002 | Akizuki | |
| 6,396,483 B1 | 5/2002 | Hiller | |
| 6,400,836 B2 | 6/2002 | Senior | |
| 6,408,301 B1 * | 6/2002 | Patton et al. | 707/741 |
| 6,414,674 B1 | 7/2002 | Kamper et al. | |
| 6,414,675 B1 | 7/2002 | Shen | |
| 6,421,453 B1 | 7/2002 | Kanevsky et al. | |
| 6,424,332 B1 | 7/2002 | Powell | |
| 6,424,338 B1 | 7/2002 | Anderson | |
| 6,429,846 B2 | 8/2002 | Rosenberg et al. | |
| 6,466,202 B1 | 10/2002 | Suso et al. | |
| 6,476,797 B1 | 11/2002 | Kurihara et al. | |
| 6,496,122 B2 | 12/2002 | Sampsell | |
| 6,504,530 B1 | 1/2003 | Wilson et al. | |
| 6,509,847 B1 | 1/2003 | Anderson | |
| 6,519,283 B1 | 2/2003 | Cheney et al. | |
| 6,523,079 B2 | 2/2003 | Kikinis et al. | |
| 6,535,749 B1 | 3/2003 | Iwata et al. | |
| 6,538,880 B1 | 3/2003 | Kamijo et al. | |
| 6,545,587 B1 * | 4/2003 | Hatakeyama et al. | 340/3.31 |
| 6,545,669 B1 | 4/2003 | Kinawi et al. | |
| 6,559,830 B1 | 5/2003 | Hinckley et al. | |
| 6,560,612 B1 | 5/2003 | Yamada et al. | |
| 6,563,939 B1 | 5/2003 | Chai | |
| 6,567,782 B1 * | 5/2003 | Wakimura | 704/500 |
| 6,583,770 B1 | 6/2003 | Antila et al. | |
| 6,587,093 B1 | 7/2003 | Shaw et al. | |
| 6,597,374 B1 * | 7/2003 | Baker et al. | 715/717 |
| 6,639,584 B1 | 10/2003 | Li | |
| 6,668,081 B1 | 12/2003 | Ilan et al. | |
| 6,670,950 B1 * | 12/2003 | Chin et al. | 345/173 |
| 6,683,649 B1 * | 1/2004 | Anderson | 348/333.05 |
| 6,686,931 B1 | 2/2004 | Bodnar | |
| 6,718,518 B1 | 4/2004 | Plow et al. | |
| 6,721,738 B2 | 4/2004 | Verplaetse et al. | |
| 6,728,812 B1 | 4/2004 | Kato | |
| 6,732,278 B2 | 5/2004 | Baird, III et al. | |
| 6,735,695 B1 | 5/2004 | Gopalakrishnan et al. | |
| 6,738,049 B2 | 5/2004 | Kiser et al. | |
| 6,741,266 B1 | 5/2004 | Kamiwada et al. | |
| 6,757,002 B1 | 6/2004 | Oross et al. | |
| 6,762,752 B2 | 7/2004 | Perski et al. | |
| 6,765,557 B1 | 7/2004 | Segal et al. | |
| 6,785,667 B2 | 8/2004 | Orbanes et al. | |
| 6,792,480 B2 | 9/2004 | Chaiken et al. | |
| 6,806,867 B1 | 10/2004 | Arruda et al. | |
| 6,819,961 B2 | 11/2004 | Jacobs et al. | |
| 6,822,640 B2 | 11/2004 | Derocher | |
| 6,828,992 B1 | 12/2004 | Freeman et al. | |
| 6,842,795 B2 | 1/2005 | Keller | |
| 6,850,780 B1 | 2/2005 | Gioscia et al. | |
| 6,871,782 B2 | 3/2005 | Keronen et al. | |
| 6,874,683 B2 | 4/2005 | Keronen et al. | |
| 6,882,299 B1 | 4/2005 | Allport | |
| 6,882,337 B2 | 4/2005 | Shetter | |
| 6,919,864 B1 * | 7/2005 | Macor | 345/1.1 |
| 6,943,774 B2 | 9/2005 | Horiki | |
| 6,954,804 B2 | 10/2005 | Lam et al. | |
| 7,010,145 B1 | 3/2006 | Haruki et al. | |
| 7,030,837 B1 | 4/2006 | Vong et al. | |
| 7,030,860 B1 | 4/2006 | Hsu et al. | |
| 7,034,777 B1 * | 4/2006 | McLarty et al. | 345/2.2 |
| 7,037,196 B2 * | 5/2006 | Kobayashi et al. | 463/29 |
| 7,051,283 B2 * | 5/2006 | Pettersson | 715/748 |
| 7,054,965 B2 | 5/2006 | Bell et al. | |
| 7,068,260 B2 | 6/2006 | Hill | |
| 7,068,499 B2 | 6/2006 | Aisenberg | |
| 7,075,540 B2 | 7/2006 | Yuasa | |
| 7,082,398 B1 * | 7/2006 | Apple et al. | 705/7.31 |
| 7,219,368 B2 | 5/2007 | Juels et al. | |
| 7,239,728 B2 | 7/2007 | Choi et al. | |
| 7,280,087 B2 | 10/2007 | Williams et al. | |
| 7,289,083 B1 | 10/2007 | Canova, Jr. | |
| 7,324,093 B1 | 1/2008 | Gettemy et al. | |
| 7,339,580 B2 | 3/2008 | Westerman et al. | |
| 7,345,675 B1 * | 3/2008 | Minakuchi et al. | 345/173 |
| 7,379,569 B2 | 5/2008 | Chikazawa et al. | |
| 7,453,443 B2 | 11/2008 | Rytivaara et al. | |

(56) References Cited

U.S. PATENT DOCUMENTS

| | | | |
|---|---|---|---|
| 7,956,845 B2 | 6/2011 | Lee | |
| 8,171,158 B1* | 5/2012 | Grignetti | 709/238 |
| 2001/0011308 A1 | 8/2001 | Clark et al. | |
| 2001/0028366 A1 | 10/2001 | Ohki et al. | |
| 2001/0029410 A1 | 10/2001 | Obradovich | |
| 2001/0035860 A1* | 11/2001 | Segal et al. | 345/173 |
| 2001/0048743 A1 | 12/2001 | Machida et al. | |
| 2001/0054968 A1 | 12/2001 | Yoshii et al. | |
| 2002/0067346 A1 | 6/2002 | Mouton | |
| 2002/0087225 A1 | 7/2002 | Howard | |
| 2002/0087546 A1* | 7/2002 | Slater et al. | 707/10 |
| 2002/0126150 A1* | 9/2002 | Parry | 345/771 |
| 2002/0130841 A1 | 9/2002 | Scott | |
| 2002/0149571 A1* | 10/2002 | Roberts | 345/174 |
| 2002/0163509 A1* | 11/2002 | Roberts | 345/173 |
| 2002/0191029 A1 | 12/2002 | Gillespie et al. | |
| 2003/0006942 A1 | 1/2003 | Searls et al. | |
| 2003/0014296 A1* | 1/2003 | Meine | 705/9 |
| 2003/0071851 A1 | 4/2003 | Unger et al. | |
| 2003/0074566 A1 | 4/2003 | Hypponen | |
| 2003/0197687 A1 | 10/2003 | Shetter | |
| 2004/0119763 A1 | 6/2004 | Mizobuchi et al. | |
| 2004/0230807 A1 | 11/2004 | Baird, III et al. | |
| 2004/0239646 A1 | 12/2004 | Wang | |
| 2005/0099400 A1 | 5/2005 | Lee | |
| 2005/0248543 A1 | 11/2005 | North et al. | |
| 2006/0066601 A1 | 3/2006 | Kothari et al. | |
| 2006/0250375 A1 | 11/2006 | Liou et al. | |
| 2006/0262146 A1 | 11/2006 | Kovisto et al. | |
| 2007/0177801 A1 | 8/2007 | Kawamoto et al. | |
| 2008/0042978 A1 | 2/2008 | Perez-Noguera | |
| 2008/0055256 A1 | 3/2008 | Kwong et al. | |
| 2008/0088592 A1 | 4/2008 | Fry | |
| 2008/0158177 A1 | 7/2008 | Wilson et al. | |
| 2008/0165133 A1 | 7/2008 | Blumenberg et al. | |
| 2008/0165140 A1 | 7/2008 | Christie et al. | |
| 2008/0180399 A1 | 7/2008 | Cheng | |
| 2008/0225009 A1 | 9/2008 | Wang | |
| 2009/0207154 A1 | 8/2009 | Chino | |
| 2009/0309851 A1 | 12/2009 | Bernstein | |
| 2009/0322410 A1 | 12/2009 | David et al. | |
| 2009/0327978 A1 | 12/2009 | Hamadene et al. | |
| 2010/0059295 A1 | 3/2010 | Hotelling et al. | |
| 2010/0060593 A1 | 3/2010 | Krah | |
| 2010/0085280 A1 | 4/2010 | Lambert et al. | |
| 2010/0115303 A1 | 5/2010 | Stedman et al. | |
| 2010/0122195 A1 | 5/2010 | Hwang | |
| 2010/0277505 A1 | 11/2010 | Ludden et al. | |
| 2011/0012856 A1 | 1/2011 | Maxwell et al. | |

FOREIGN PATENT DOCUMENTS

| | | |
|---|---|---|
| EP | 0546704 A2 | 6/1993 |
| EP | 0660218 A1 | 6/1995 |
| EP | 0725331 A1 | 8/1996 |
| EP | 0807879 A2 | 11/1997 |
| EP | 0896308 A1 | 2/1999 |
| EP | 0898223 A2 | 2/1999 |
| EP | 0911720 A1 | 4/1999 |
| EP | 0984351 A2 | 3/2000 |
| GB | 2302429 | 1/1997 |
| GB | 2338148 | 12/1999 |
| JP | 61234419 | 10/1986 |
| JP | 62078621 | 4/1987 |
| JP | 2127720 | 5/1990 |
| JP | 5341877 | 12/1993 |
| JP | 6051907 | 2/1994 |
| JP | 6241718 | 8/1994 |
| JP | 7295747 | 11/1995 |
| JP | 8036479 | 2/1996 |
| JP | 09026832 | 1/1997 |
| JP | 9101842 | 4/1997 |
| JP | 10-357263 | 12/1998 |
| JP | 11-079000 | 3/1999 |
| JP | 200039097 | 12/2000 |
| KR | 100593982 | 6/2006 |
| KR | 1020090029518 | 3/2009 |
| WO | 9105327 | 4/1991 |
| WO | 9512843 | 5/1995 |
| WO | 9641329 | 12/1996 |
| WO | 9722107 | 6/1997 |
| WO | 9744946 | 11/1997 |
| WO | 9745794 | 12/1997 |
| WO | 9921077 | 4/1999 |
| WO | 9931649 | 6/1999 |
| WO | 0127868 | 4/2001 |
| WO | WO 0127868 * | 4/2001 |

OTHER PUBLICATIONS

Bier Eric, et al, "Toolglass and Magis Lenses: The see-through interface", 1993, ACM-0-89791-601, pp. 73-80.

QuVis, Inc, "Users Guide to QuBit". 1999, edition 1.0, pp. 1-58.

Lehrbaum, R., et al, "Overview of Gateways "Connected Home" Initiative", Nov. 15, 2000, Http://www.linuxdevices.com/articles/AT3155528116.html, pp. 1-4.

Tsukada, Y., et al., "Layered Touch Panel: The input device with two touch panel layers", 2002, Conference on Human Factors in computing systems CHI '02 extended abstracts on Human Factors in computing systems, pp. 1-2.SU.

R. Neale. "Laptops and notepads—the arrival of the second display". Electronic Enpineering, pp. 9 -10. Oct. 2000.

Altera, Inc., "Section II. Memory Standard Overviews" http://www.altera.com/literature/hb/external-memory/emi_intro_over.pdf. Jan. 2010.

Altera, Inc., "Creating Low-cost Intelligent Display Modules with an FPGA and Embedded Processor" http://www.alteracom/literature/wp/wp-01074-creating-low-cost-intelligent-display-modules-with-fpga.pdf . 2008.

Altera, Inc., Implementing a Cost-Effective Human-Machine Interface for Home Appliances http://www.altera.com/literature/wp/wp-01083-cost-effective-hmi-home-appliances.pdf Jul. 2009, Kim, H., et al., "A Mobile-Display-Driver IC Embedding a Capacitive-Touch-Screen Controller System", ISSCC 2010 Session 6 Displays & Biomedical Devices, 6.1 Samsung Electronics, Yongin, Korea; 978-1-4244-6034-2/10 ( https:/(submissions.miracd.com/ISSCC2010/WebAP/PDF/AP_Session6.pdf).

Altera, Inc., "Using FPGAs to Render Graphics and Drive LCD Interfaces" http://www.altera.com/literature/wp/wp-01100-graphic-lcd-display.pdf Apr. 2009.

USPTO "Communication Responsive to Application Filed May 11, 2010" mailed Jan. 10, 2012; U.S. Appl. No. 12/777,886, filed May 11, 2010.

USPTO "Non-Final Office Action" mailed Mar. 1, 2012; U.S. Appl. No. 12/642,467, filed Dec. 18, 2012.

USPTO "Non-Final Office Action" mailed Mar. 30, 2012; U.S. Appl. No. 12/777,895, filed May 11, 2010.

USPTO "Non-Final Office Action" mailed Mar. 12, 2012; U.S. Appl. No. 12/642,461, filed Dec. 18, 2012.

Kitazawa, Y., et al., "Information Processing Device and Method," Japanese Patent Application No. 07172621, filed Jul. 7, 1995.

United States Patent and Trademark Office, Office Action for U.S. Appl. No. 12/770,619, dated May 8, 2012.

United States Patent and Trademark Office, Office Action for U.S. Appl. No. 12/777,886, dated Jun. 27, 2012.

United States Patent and Trademark Office, U.S. Final Office Action dated Aug. 29, 2012 for U.S. Appl. No. 12/770,619.

United States Patent and Trademark Office, U.S. Final Office Action dated Aug. 29, 2012 for U.S. Appl. No. 12/777,895.

United States Patent and Trademark Office, U.S. Final Office Action dated Jan. 17, 2013 for U.S. Appl. No. 12/770,619.

State Intellectual Property Office, P.R. China, Chinese Office Action dated Dec. 11, 2012 for Chinese Patent Application No. 201080019231.7.

United States Patent and Trademark Office, Notice of Allowance dated Nov. 19, 2012 for U.S. Appl. No. 12/777,895.

USPTO, U.S. Office Action for U.S. Appl. No. 12/770,415, mailed Apr. 2, 2013.

* cited by examiner

TOUCH SCREEN WITH USER INTERFACE ENHANCEMENT

PRIORITY TO RELATED APPLICATIONS

This is a continuation of U.S. application Ser. No. 10/125,066, filed Apr. 17, 2002 and claims priority to U.S. Patent Provisional Application Ser. No. 60/291,694, filed on May 16, 2001, both of which are incorporated herein by reference.

BACKGROUND

The present invention relates to computer interface devices, and more particularly, to a computer touch pad with integrated display device, and enhancements to the portable computer user interface employing same.

Touch pads are widely used in computer applications, particularly as pointing devices in portable computers. In typical usage, the touch pad is a featureless, finger sensitive surface in a rectangular opening of the palm rest of the computer. The touch pad serves solely as an input device for the computer. The touch pad functions primarily as a cursor pointing device, but some touch pads offer additional functions.

For example, U.S. Pat. No. 5,543,591 to Gillespie et al. discloses a typical prior art touch pad sensor in which finger tapping gestures in designated regions of the touch surface invoke special commands on the computer. U.S. Pat. No. 5,943,052 to Allen et al. discloses a touch pad in which finger motions in designated regions invoke a scrolling command. These tap regions and scrolling regions have proven useful to expert users but confusing to novice users as the regions are invisible to the eye but different in behavior. Marking the regions with screen-printed icons on the opaque sensor surface can help, but it can also lead to greater confusion if the regions are software configurable.

A further disadvantage of prior art touch pads is that they use up a significant fraction of the surface area of the computer for a single dedicated input function. Other pointing devices such as isometric joysticks (see, e.g., U.S. Pat. No. 5,521,596 to Selker et al) and force sensing keys (see, e.g., U.S. Pat. No. 4,680,577 to Straayer et al) have been proposed as compact alternatives, but these devices are not as expressive or as easy to use as touch pads.

Touch screens are also well known in the art. One example of a touch screen is disclosed in U.S. Pat. No. 4,806,709 to Blair. In typical use, the main display screen of a computer is overlaid with or implemented as a touch sensitive input device. This eliminates the need to dedicate separate parts of the surface of the computer for input and output. If the touch screen serves as the main pointing device of the computer, pointing is accomplished by a direct mapping from finger position to selection of a point on the screen beneath the finger. This direct mapping makes touch screens easy to understand and use. However, touch screens are impractical for everyday use as the main display of a computer because the user's arm tires from being continuously held up to touch the screen. If the touch screen is laid flat to avoid arm wear, the arm tends to rest on the touch-sensing surface and, with many touch sensing technologies, this disrupts the ability to sense the finger. Touch screens the size of a main computer display may also be prohibitively bulky or expensive for use in applications that do not require them.

A transparent touch pad suitable for placement over a display such as an LCD screen has been developed and is disclosed and claimed in co-pending U.S. patent application Ser. No. 09/415,481, filed Oct. 8, 1999, assigned to the same assignee as the present invention. This application discloses a touch screen having the small size and low cost of a conventional touch pad for portable computers and notes that the touch pad and display could be included in a personal computer to enhance the user interface in various ways, but it does not disclose details of the software implementation, nor how such a device can simultaneously function as the pointing device of the computer, nor how this arrangement enhances the user interface.

SUMMARY

The drawbacks and disadvantages of the prior art are overcome by the touch screen with user interface enhancement.

The present invention discloses a graphical user interface in a computing device having a processor running an operating system and a display. The graphical user interface comprises a touch screen and a driver coupling the touch screen to the operating system. The driver displays a plurality of icons on the touch screen with at least one of the icons identifying at least one region on the touch screen that will cause an action on the display and not on the touch screen in response to contact by an object on the region.

The present invention also discloses another embodiment of a graphical user interface in a computing device having a processor running an operating system and a display. The graphical user interface comprises a touch screen, having an unactivated state and an activated state, and a driver coupling the touch screen to the operating system. The driver displays a plurality of icons on the touch screen with at least one of the icons identifying at least one region on the touch screen that will cause an action on the display and not on the touch screen in response to contact by an object on the region.

Lastly, the present invention discloses another embodiment of a graphical user interface in a computing device having a processor running an operating system and a display. The graphical user interface comprises a touch screen and a driver coupling the touch screen to the operating system. The driver displays a plurality of icons on the touch screen with at least one of the icons identifying at least one region on the touch screen that will cause an action on the display and not on the touch screen in response to contact by an object on the region. The driver has an application programming interface that enables an application to display at least one image on the touch screen.

BRIEF DESCRIPTION OF THE DRAWING FIGURES

Referring now to the figures, wherein like elements are numbered alike:

DETAILED DESCRIPTION

Those of ordinary skill in the art will realize that the following description of the present invention is illustrative only and not in any way limiting. Other embodiments of the invention will readily suggest themselves to such skilled persons.

Figure 1:
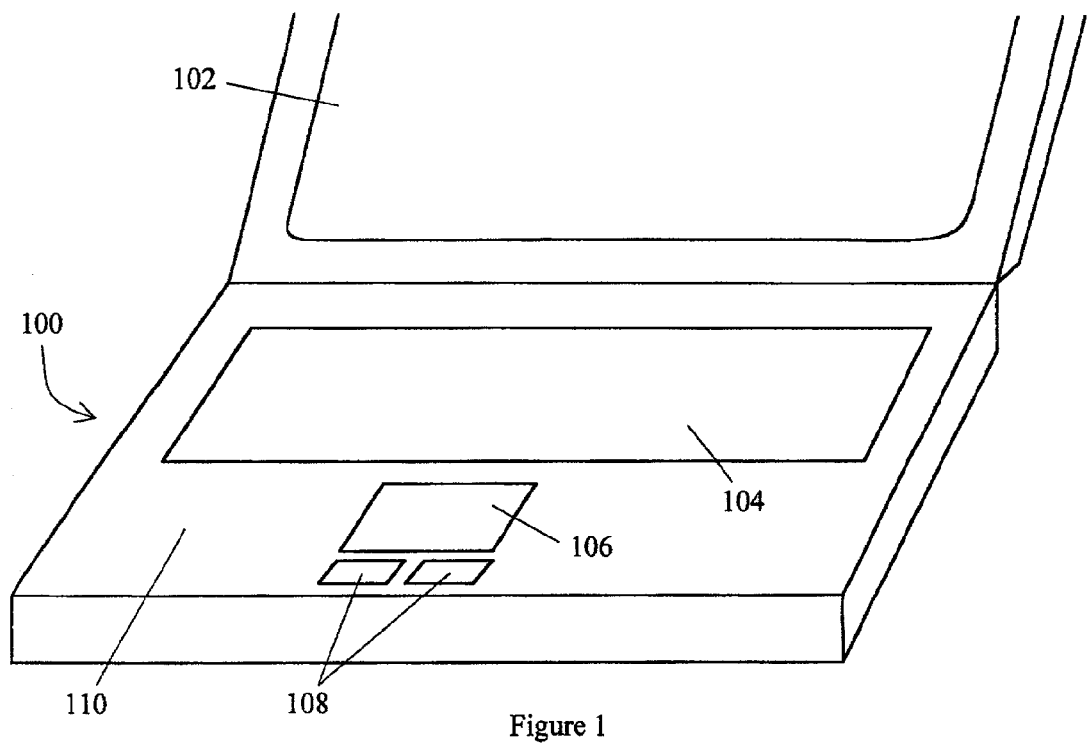
FIG. 1 is a diagram showing a notebook computer system with main display, keyboard, and touch screen.

FIG. 1 illustrates a notebook computer system 100 with main display 102 and keyboard 104. Touch screen 106 is mounted in palm rest 110. The touch screen is typically equipped with left and right "mouse" buttons 108. Touch screen 106 is integrated into computer system 100 in a similar way as a touch pad would be in a prior art computer. Touch screen 106 will usually be located in the palm rest as shown in FIG. 1, but other locations are equally applicable, such as above the keyboard, adjacent to the keyboard or main display, or located in a separate enclosure connected by cable or wireless link to the computer. Although touch screen 106 usually replaces the conventional touch pad of a computer, touch screen 106 could be introduced in addition to the other user interface devices of the computer.

Figure 2:
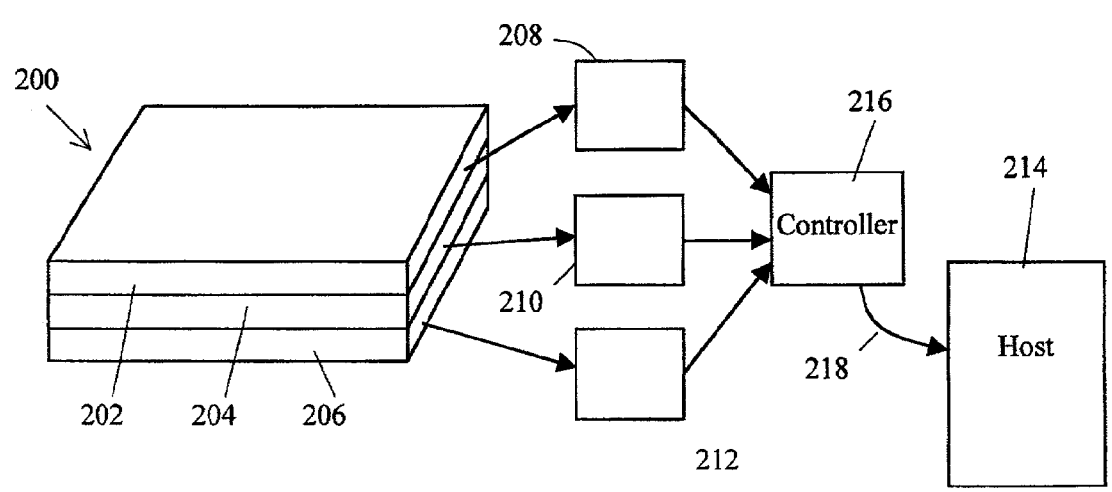
FIG. 2 is a diagram showing an illustrative embodiment of a touch screen in greater detail.

FIG. 2 illustrates an illustrative embodiment of touch screen 106 in greater detail. Touch screen assembly 200 consists of touch sensor 202, display 204, and backlight 206 stacked or laminated together. Touch screens can be built in a variety of alternative ways as are well known in the art. For example, touch sensor 202 can be an active sensor employing capacitive, resistive, inductive, or other methods, or it can be a passive surface on which touch sensing is accomplished by optical, acoustic, or other methods. Capacitive touch sensors are ideally suited for use in the present invention due to their sensitivity, low cost, ruggedness, and suitability to small sensing areas. However, any touch screen technology would serve for the present invention.

Similarly, display 204 can be a liquid crystal display (LCD), organic light emitting diode (OLED) display, electroluminescent display, or any other type of small display suitable for mounting in a portable computer. LCD displays are ideally suited for use in the present invention due to their low cost and availability, but other types of displays may be employed. Display 204 may be color or monochrome, and need not have the same resolution, color capabilities, or other qualities as the main display of the computer.

The touch screen assembly may include a backlight 206 to enhance readability in all lighting conditions. In alternative embodiments, backlight 206 may be replaced by a frontlight, passive reflector, or other light source, or it may be omitted altogether.

Touch screen assembly 200 may include additional layers or components to assist the mounting or mechanical properties of the touch screen or to integrate the touch screen with other components of the computer system. The touch screen may also include hardened, antireflective, textured, or other surface layers. The inclusion, omission, or nature of these additional layers and components is immaterial to the present invention.

Touch sensor 202 is connected to touch sensing controller 208. The nature of controller 208 depends on the design of touch sensor 202 and its details are immaterial to the present invention. Likewise, display 204 is connected to a suitable display controller 210, and backlight 206, if present, is connected to backlight controller 212. Each of controllers 208, 210, and 212 communicate with host computer 214. In an illustrative embodiment, controllers 208, 210, and 212 are connected to a central touch screen controller 216 that connects to host computer 214 by a single interface 218. Interface 218 may be a mouse interface such as PS/2, or a general purpose peripheral interface such as the Universal Serial Bus (USB). USB has the advantage of high bandwidth and wide availability. Any of controllers 208, 210, 212, and 216 may be implemented as chips or discrete components, combined onto fewer chips or one chip, integrated with assembly 200, or combined with other functions of host computer 214. Host computer 214 may be embodied in the central processing unit of computer system 100, a peripheral processor such as a USB host controller, or a combination thereof.

In an alternative illustrative embodiment, controllers 208, 210, and 212 may connect to host computer 214 through different interfaces. For example, touch screen controller 208 could connect as a conventional touch pad using a PS/2 interface, while display controller 210 and backlight controller 212 connect by USB or by a specialized display interface.

Because touch screen 106 of FIG. 1 replaces a conventional touch pad, touch screen 106 usually serves as a conventional pointing device for the computer. For this reason, the touch screen must be able to interface to the computer as a conventional mouse. This is a further reason for interface 218 to be either a mouse interface such as PS/2, or a general interface such as USB that includes support for conventional mice. Interface 218 may also provide for an alternate or extended interface protocol that allows for additional information about finger activity to be communicated to computer 214, and for computer 214 to control display 204 and backlight 206. This additional finger activity information may include the absolute location of the finger on the sensor surface. When appropriate driver software is loaded onto computer 214, the driver software can enable the alternate or extended interface protocol to support the user interface enhancements of the present invention. When other driver software, such as a conventional mouse or touch pad driver, is loaded instead, interface 218 can revert to mouse or touch pad compatibility using touch sensor 202 as a conventional touch pad, and controller 210 or 216 can operate the display autonomously, such as by furnishing a suitable default display image for display 204.

When the touch screen is used as a conventional touch pad, finger motions on the touch sensor (e.g., in a cursor positioning region, which could identify a starting position) will typically cause corresponding motions of a cursor on the main display, and clicks of "mouse" buttons (or action control icons) 108 will typically cause special actions, such as selections on the main display. Tapping gestures may be interpreted as "mouse" clicks or other special actions, as disclosed in U.S. Pat. No. 5,543,591. Other gestures may also be recognized, such as scrolling motions as disclosed in U.S. Pat. No. 5,943,052. The default display image may include graphical icons to indicate special tapping or scrolling regions on the touch sensor surface or the default screen image may be a blank screen with only a manufacturer's logo.

In one embodiment, the cursor positioning region is denoted by the absence of icons for actions, other than cursor positioning. However, there are many different ways of identifying the cursor positioning region on the touch screen, such examples include, but are not limited to, a box could enclose the cursor positioning region, a shaded region or icon could cover the entire cursor positioning region, or an icon could be centered in an otherwise blank area, thus labeling the blank area as a cursor positioning region.

Figure 3:
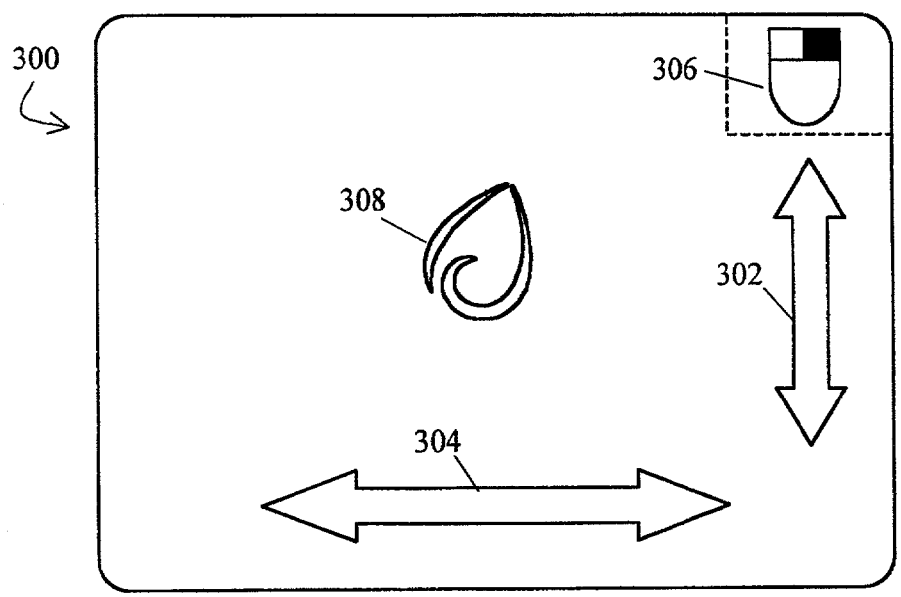
FIG. 3 is a diagram illustrating an example default image for use when the touch screen is operating as a conventional touch pad.

FIG. 3 illustrates an example default image for use when the touch screen is operating as a conventional touch pad. FIG. 3 depicts the image on the touch screen display as seen by the user. Image 300 includes arrow icons 302 and 304 indicating scrolling regions, an icon 306 indicating a corner tap region that simulates a right mouse button click, and an icon 308 which represents a logo for the computer vendor.

Alternatively, computer system 100 of FIG. 1 can include a secondary pointing device, such as an isometric joystick located in keyboard 104 or an external mouse, which relieves touch screen 106 from the responsibility of functioning as primary pointing device in addition to its role as an enhanced user interface device.

A conventional touch pad with default screen image is just one of several general modes of usage that are envisioned for the touch screen of the present invention. Subsequent drawing figures illustrate several other usage modes that employ the touch screen as a fully interactive input/output device to enhance the user interface of the computer system. These general usage modes include "iconic," "auxiliary," and "pop-up" touch screen modes, each with a variety of possible applications. The same touch screen can operate in each of these various modes, or other modes, at different times. The different modes can also appear on the screen at the same time; for example, icons can appear in an auxiliary or pop-up image, or an auxiliary or pop-up image could be overlaid in a window on the iconic mode image instead of fully replacing that image.

Figure 4:
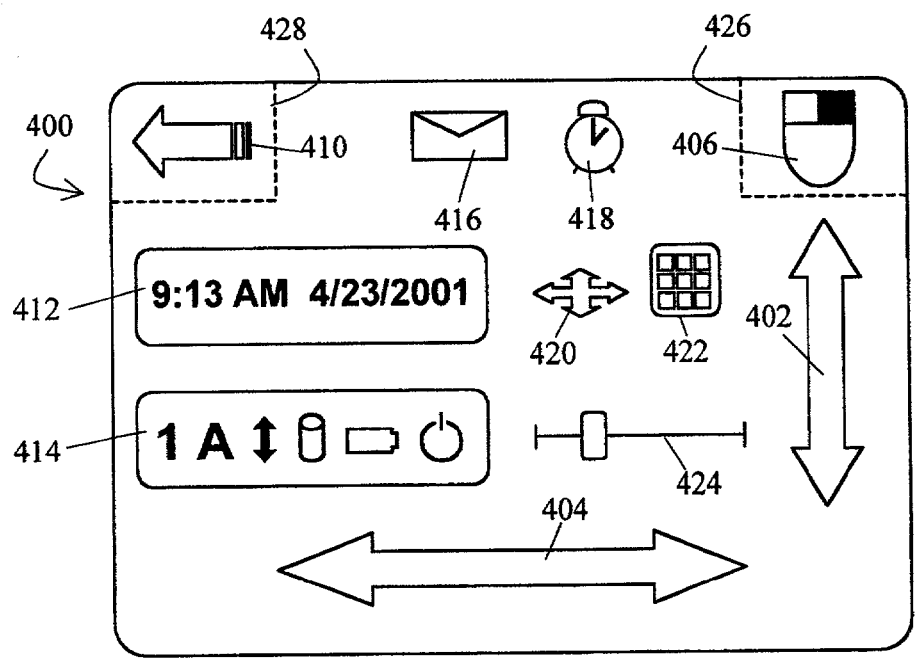
FIG. 4 is a diagram illustrating an example of a first "iconic" usage mode of the touch screen.

FIG. 4 illustrates an example of a first "iconic" usage mode of the touch screen. In the iconic mode, the screen displays an image that includes a number of small icons such as pictures or buttons. The touch sensor operates as a touch pad pointing device in iconic mode, in which finger motions and taps on the sensor are generally interpreted the same as when the touch screen operates as a conventional touch pad. The screen image in iconic mode may include elements in common with the default image of FIG. 3, as the two modes operate similarly. Iconic mode will generally display additional icons relating to software that is running on the computer and other aspects of the operation of the computer.

In the example image of FIG. 4, image 400 includes scroll arrow icons 402 and 404 and a touch region, such as illustrated by corner tap icon 406 in common with FIG. 3. Logo 308 has been omitted from image 400 in this example to reduce clutter. In an alternate embodiment, non-critical graphics from the default image could be retained as a background image on which icons overlap; in yet another embodiment, a different image such as static or dynamic "wallpaper" may serve as a background image.

In example image 400, additional icons have been added to represent various system status indicators and functions. Icon 410 defines a second touch region or a corner tapping region to activate the "back" function of web browsers and other software. As the user enables and disables special tap regions and changes their assigned functions, such as by using a software control panel, the tap region icons such as icons 406 and 410 can appear, disappear, move, and change in shape to reflect the current settings.

Icon 412 is a continuous display of the time and date. This icon would normally have no effect on the interpretation of finger taps within its region. Instead, a finger tap within its boundaries would be interpreted as a simulated mouse button click, just as if the tap occurred away from any icon. If every icon responded specially to finger taps, the main function of tapping to simulate a mouse click would become too inconvenient to use. A visual convention may be used to indicate which icons represent tap-sensitive regions; in the example of FIG. 4, dashed lines 426 and 428 are used to indicate these regions.

Icon group 414 includes the traditional set of status icons that appear on modern portable computers, such as numeric keypad lock, caps lock, scroll lock, hard disk activity, battery life, and system power. By locating these system icons on the touch screen display, the system designer eliminates the need for the special dedicated LED or LCD status displays that are typically used in prior art computers.

In some prior art portable computers, the dedicated system status displays are situated so that they are visible even when the cover of the computer is closed over the main display. The touch screen of the present invention could similarly be situated so that all or part of the screen image is visible when the cover is closed, for example, by causing the touch screen to protrude from under the cover or by cutting a notch in the cover over the location of the touch screen. This arrangement would allow the user to monitor battery recharging and other quiescent activities of the computer system while the computer is not in use.

Icon 416 is an e-mail notification status icon; icon 416 may, for example, change to a new shape or animated image to indicate that e-mail has arrived. Icon 418 similarly notifies the user of imminent appointments. These icons suggest a natural action that could be taken when the user taps on the icons, such as opening the associated e-mail reading or appointment scheduling software. Because these icons are located nearer the center of the touch sensing area and could easily be tapped by accident, icons 416 and 418 may be made sensitive to finger taps only when they have been activated by some separate means such as pressing a special function key on keyboard 104.

Icons 420 and 422 represent commands to select pop-up applications on the touch screen. Icon 420 selects an application launcher. Icon 422 selects a calculator or numeric keypad. Like icons 416 and 418, icons 420 and 422 may be made sensitive to finger taps only when the touch screen is in the activated state.

Icon 424 represents the volume control for the sound system and speakers of the computer. Icon 424 includes a visual slider and "thumb." The position of the thumb on the slider reflects the current volume setting. When the touch screen is in the activated state, finger motions within the volume control region can move the thumb to a different location on the slider to adjust the volume level. When the touch screen is not in the activated state, icon 424 is a visual display only and has no special interpretation when touched. Similar slider controls may be provided to adjust other system parameters such as the sound balance among several sound sources, the brightness and contrast of the main screen or touch screen, or the power management strategy.

The icons depicted in FIG. 4 are illustrative of the types of icons that can be provided on the iconic mode screen. FIG. 4 does not necessarily represent the ideal selection or placement of icons. Human-factors testing may be used to decide on the number, types, and placement of icons in the default iconic screen. Also, it may be advantageous to allow the user to select which icons are present and to rearrange the icons, possibly using a software control panel. Because the number of candidate icons likely exceeds available space, it may be desirable to provide multiple iconic screen layouts selectable by some means such as in the software control panel or by tapping on an icon on the touch screen.

It will be obvious to one skilled in the art that many other images, logos, status indicators, command buttons, controls, and other types of icons can share the touch screen display in the iconic usage mode. These icons can be purely display indicators, or they can indicate control regions that respond specially to finger motions and/or finger taps, either at all times or only when the touch screen has been activated in a special way. Some icons may be built-in by the system designer, such as the system status icons or the logo of the computer manufacturer. Other icons may be created and maintained by application software running on the computer, such as an e-mail notification icon.

Figure 5:
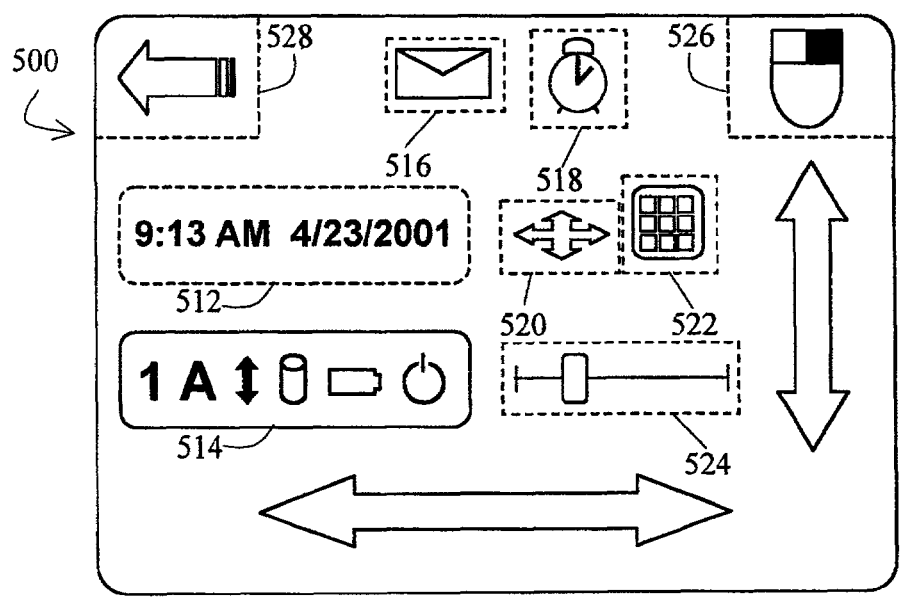
FIG. 5 is a diagram illustrating the touch screen image of FIG. 4 modified to indicate the activated state of the touch screen using a dashed line around each icon that is touch-sensitive in the activated state.

The activated state of the touch screen may be indicated by a visual convention. FIG. 5 illustrates the touch screen image of FIG. 4 modified to indicate the activated state of the touch screen using a dashed line around each icon that is touch-sensitive in the activated state. In image 500, dashed lines 516, 518, 520, and 522 have surrounded certain icons to indicate that finger taps in the regions near these icons will be interpreted as special commands to the icons. Similarly, dashed outline 524 indicates that finger motions in the volume control region will adjust the setting of the control. Outline 512 for the time and date icon has become dashed to indicate that a tap on this icon will activate a special function such as setting the time or accessing a world clock. Outline 514 for the system status icons remains solid to indicate that, in the example of FIG. 5, these icons have no special tapping functions in the activated state. Dashed lines 526 and 528 remain to indicate that the corner tap regions continue to have their special tap interpretations when the touch screen is in the activated state. Many other visual conventions would serve equally well to indicate touch-sensitive icons, such as solid or colored lines, colored or inverted backgrounds, changes in brightness or coloration of the activated icons, changes in shape or animation of the activated icons, or other well-known conventions for highlighting a portion of an image.

The example of FIGS. 4 and 5 illustrates the same set of icons in the activated and unactivated state. However, activation of the touch screen could also create additional icons that are not present, for example to reduce clutter, when the touch screen is not in the activated state. Existing icons could also be removed or rearranged, although to avoid confusion, this could be done only to replace icons not useful in the activated state, such as icon 414 of FIG. 4, with other icons that are most useful when activated, such as icons similar to icons 420 and 422.

There are many possible alternative mechanisms for the user to signal the activation of touch screen icons. In the simplest case, the icons are either always inactive or always active for tapping or motion commands. The corner tapping and scrolling region icons 302, 304, and 306 of FIGS. 3 and 402, 404, 406, and 410 of FIG. 4 are examples of icons that are active at all times. The logo icon 308 of FIG. 3 and system status icons 414 of FIG. 4 are examples of icons that are inactive at all times. For simple touch screen images like that of FIG. 3, all icons may fall into these simple categories and no overt activation mechanism is needed. For more elaborate touch screen images like that of FIGS. 4 and 5, an overt activation mechanism is necessary for those icons that must respond to touch but cannot reasonably be made touch sensitive at all times.

Figure 6A:
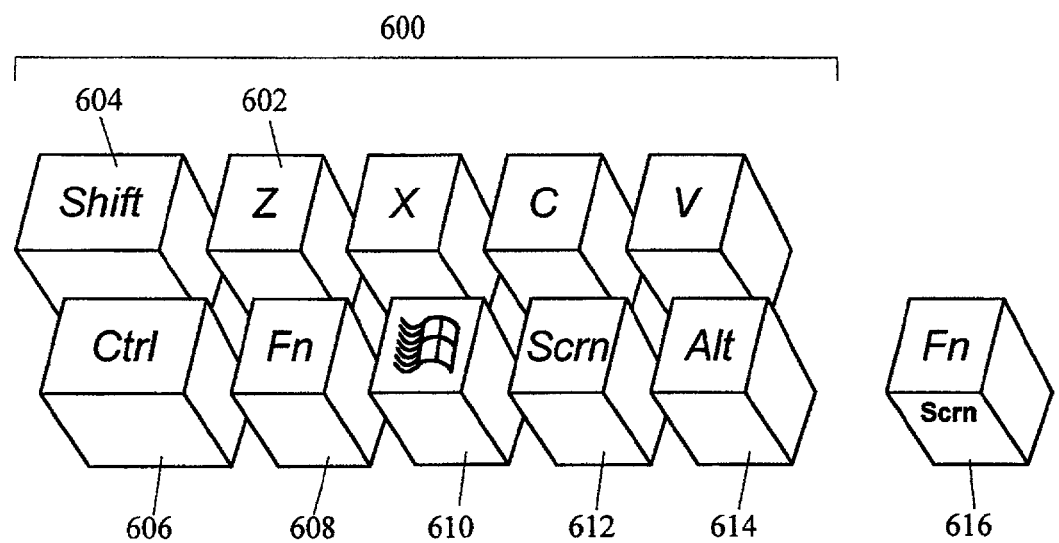
FIG. 6A is a diagram illustrating a portion of the keyboard featuring several keys.

In an illustrative embodiment, a key on the main keyboard 104 of computer system 100 of FIG. 1 is designated as the touch screen activation key. FIG. 6A illustrates a portion 600 of the keyboard featuring several keys. Most keys of the keyboard, such as letter "Z" key 602, have preassigned functions that do not overlap well with touch screen activation. Even the existing shifting keys such as shift key 604, control key 606, and Alt key 614 are not suitable because they are often pressed in conjunction with mouse clicks in application software for features such as extending selections; hence, it is desirable for the user to be able to tap normally on the touch sensor to simulate a mouse click while these shifting keys are pressed.

Function or "Fn" key 608 is common on the keyboards of portable computers. This key, when held down, changes the interpretations of various other keys to perform special control functions. For example, in one portable computer, the arrow keys change to screen brightness controls, certain letter keys change to become a numeric keypad, and various other keys change to control the external video and various other functions. The alternate "Fn" functions of the various keys are often indicated by blue writing next to the white writing indicating the primary function of a key. Because the "Fn" key is often absent on desktop computers, software typically does not give special interpretations to mouse clicks in conjunction with the "Fn" key. The usage and functionality of "Fn" key 608 coincides well with the function of activating the touch screen. In one illustrative embodiment, holding down the "Fn" key causes various icons on the touch screen to be activated with visual feedback as shown in FIG. 5, in addition to the normal action of redefining various keys of the main keyboard. Releasing the "Fn" key causes the touch screen to revert to its pointing device usage at the same time as the keys of the main keyboard revert to their primary functions.

If "Fn" key functions are indicated by a color code (such as blue writing), this color code can be employed on a color touch screen for extra mnemonic effect. For example, blue outlines or coloration can be used on the icon itself or in a background or outline to indicate those icons whose behavior will change when the touch screen is in the activated state. The outline or background could then change from blue to white when the touch screen is activated, signifying that the icons are now sensitive to touch.

Computers intended for use with the Microsoft Windows® operating system often include a "Windows" key 610. The "Windows" key also changes the interpretations of various other keys on the computer keyboard while it is held down. The "Windows" key is another candidate for a touch screen activation key with semantics similar to those disclosed for the "Fn" key. Those practiced in the art will recognize that certain other keys that appear on some portable computer keyboards, such as the "AltGr" key, may also be suitable candidates for a touch screen activation key.

In an alternate embodiment, a new key 612 can be added on or near the keyboard to serve as a dedicated touch screen activation key. Key 612 could operate as an activation shift key for which the touch screen is activated for the duration that the key is held down. Or, key 612 could operate as an activation prefix key for which the touch screen is activated after the key is struck and until an icon is tapped. In yet another embodiment, key 612 could operate as a toggle key that alternately activates and deactivates the touch screen each time it is struck. Any of these schemes or others would work, but it may be advantageous to use an existing key such as "Fn" key 608 or "Windows" key 610 instead of a dedicated key 612. Using an existing key simplifies keyboard design and is more familiar to users accustomed to standard keyboards. However, it may be advantageous to label the existing key with an icon or lettering to indicate its dual function as a touch screen activation key in addition to its normal label, as illustrated by key 616 of FIG. 6A.

Figure 6B:
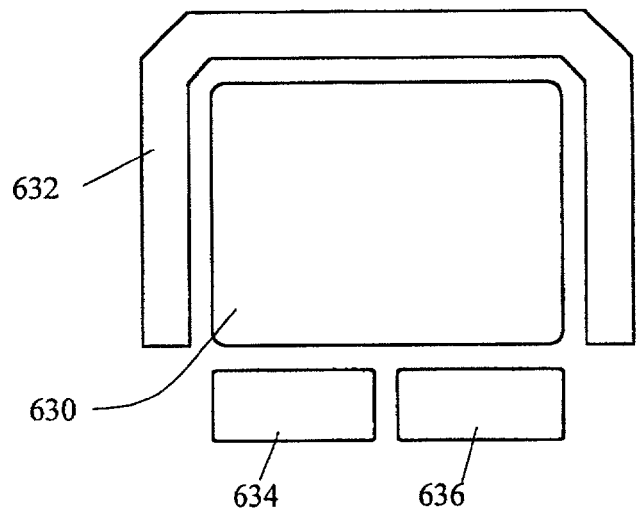
FIG. 6B is a diagram illustrating one possible arrangement of a special touch sensitive region or second touch sensor could be provided that activates the touch screen when touched.

Many other touch screen activation mechanisms are possible alternatives to a keyboard key. In one embodiment, an additional mouse button is provided adjacent to buttons 108 of FIG. 1 to activate the touch screen. Alternatively, a special touch sensitive region or second touch sensor could be provided that activates the touch screen when touched. FIG. 6B illustrates one possible arrangement of such a button or touch sensor. Toroidal button or touch sensor 632 surrounds all or part of the touch screen 630. Toroidal button or sensor 632 is distinct from conventional "mouse" buttons 634 and 636. In one usage, the toroidal button would activate the touch screen when touched or pressed. Alternatively, the touch screen icons could remain active except when toroidal button or sensor 632 is touched or pressed. This latter usage may be advantageous since the user can be expected to keep the hand near the keyboard or near conventional buttons 634 and 636, and therefore also near sensor 632, during conventional operation of the computer when touch screen 630 is mostly likely to be operated unconsciously as a pointing device.

Another possible activation mechanism is to provide a region on the touch screen which is always active, and in which finger taps are interpreted as a signal to enter or toggle the activated state of the touch screen. A software control panel could offer the activation function as one of the possible functional assignments of corner tap regions 406 and 410 of FIG. 4.

Yet another mechanism is for the user to click on a soft button or icon on the main display to activate the touch screen. Numerous other activation mechanisms are well known that could serve for touch screen activation, such as finger motion gestures, voice commands, foot switches, retinal gaze tracking, etc. Software applications that make use of the touch screen can offer additional, application-specific activation mechanisms.

In yet another embodiment, icons are individually activated by being touched in a special way instead of by an overall touch screen activation state. For example, single taps near an icon could be interpreted as normal mouse clicks but rapid double taps could trigger the "activated" function of the icon. Alternatively, touching an icon with multiple fingers, or hovering the finger over an icon without touching the surface of the touch screen, or holding the finger steady over an icon for a given duration, could trigger the activated function of the icon.

Some touch screen technologies are sensitive to other objects, such as a pen, pencil, or pointer, in addition to fingers. In such devices, a finger tap could trigger an activated function while a pen tap would be interpreted as a normal mouse click, or vice versa. Or, a special button could be provided on the body of the pen that triggers the activated function of an icon when pressed.

It is also possible to provide several of these alternate mechanisms at once. These multiple activation mechanisms could be synonyms in that they all activate the same special function of each icon, or different activation mechanisms could activate different special functions of the icons. Multiple different special functions should be used with caution because of the likelihood of confusing the user.

Figure 7A:
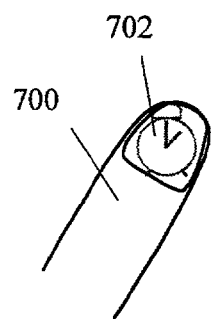
FIG. 7A is a diagram illustrating small icons that may be smaller than a finger and may be completely obscured by the finger when the finger touches them.

With iconic screen images such as that of FIGS. 4 and 5, it is desirable to include many small icons on the screen to provide access to a maximum number of features. As shown in FIG. 7A, such small icons 702 may be smaller than finger 700 and may be completely obscured by the finger when the finger touches them. Because the finger will cover the icon only momentarily, this effect may not be a serious problem. However, various techniques can be employed to solve the problem of obscuring small icons, and in an illustrative embodiment the screen images are designed so that the icons are either large enough to avoid being obscured, or situated so that the user can operate them even when they are momentarily obscured, or provided with a mechanism to eliminate the problem of obscuring small icons.

Figure 7B:
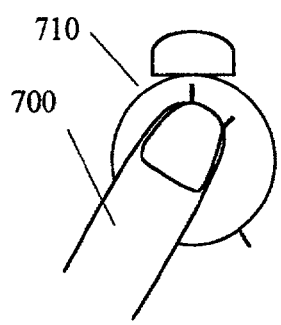
FIG. 7B through 7E illustrate several mechanisms to eliminate the problem of obscuring small icons.
Figure 7C:
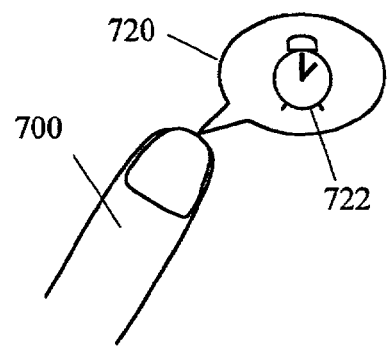
Figure 7D:
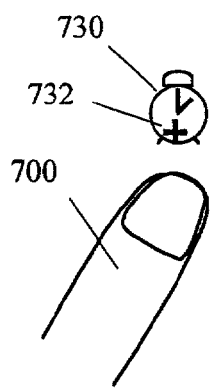
Figure 7E:
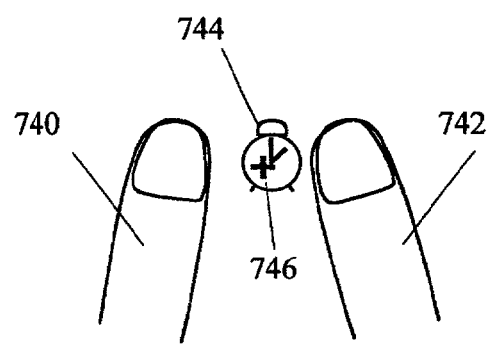

FIGS. 7B-7E illustrate several such mechanisms. In the mechanism of FIG. 7B, icon 710 expands whenever finger 700 passes over it. In the mechanism of FIG. 7C, an image 722 of the icon or image area under the finger is displayed in "callout" 720 adjacent to finger 700 or elsewhere on the screen. In the mechanism of FIG. 7D, finger 700 selects not the icon directly under the finger, but the icon 730 under a "hot spot" 732 displaced enough from the center of finger contact to be visible around the finger. As shown in FIG. 7D, a crosshair may help to visually indicate the hot spot 732 to avoid confusion. The mechanism of FIG. 7E uses the property that certain touch sensing technologies, such as that disclosed in U.S. Pat. No. 5,543,591, compute the centroid of all finger contact on the sensor. With such sensors, the user can select icon 744 without obscuring it from view by placing two fingers 740 and 742 on either side of the icon instead of a single finger directly on the icon. Crosshair 746 may be provided to make the centroid of finger contact more visually apparent.

Figure 8A:
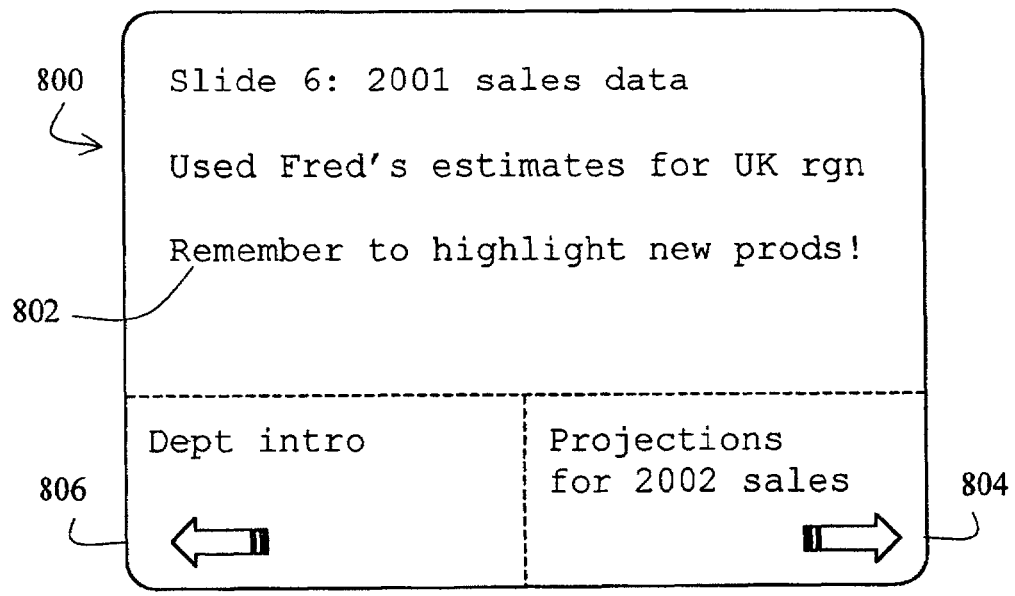
FIGS. 8A through 8D are diagrams illustrating use of a small control panel on the touch screen associated with an application, reserving the entire main display for visual data associated with the application.

FIG. 8A illustrates an example of a second "auxiliary" usage mode of the touch screen of the present invention. In the auxiliary mode, the touch screen displays an auxiliary image specific to a software application that is running on the computer. In an illustrative embodiment, a software application displays its auxiliary image only when it has the "input focus" as determined by the operating system. In most computer operating systems, application windows on the main display screen are given the focus based on which was last clicked by the pointing device, or on which currently contains the cursor. The auxiliary image for an application may include graphic icons and buttons that may or may not coincide with those of the iconic mode. Alternatively, the auxiliary image may be a pure image, such as an advertisement or a set of notes accompanying a presentation.

In the auxiliary mode, finger motions and/or finger taps would typically be given a special interpretation by the application. If the application treats finger motions specially, the touch screen will be unable to move the cursor on the main display as long as the application imposes its special interpretation on finger motions. This may be acceptable if an alternate cursor motion device or mechanism is present, or if the application does not need a cursor, or if the special interpretation lasts for only a brief duration. Alternatively, if the application treats only finger taps specially, then the user can use the touch screen to move the cursor on the main display, but the user must use the "mouse" buttons 108 of FIG. 1 to click or select items on the main display. In another alternative, the application may display an auxiliary image but allow the touch screen to interpret finger motions and taps in the same way as the iconic mode. In this latter alternative, if the auxiliary image includes buttons or control icons, then a special activation mechanism must be used to activate the buttons or controls as disclosed for the iconic mode. Applications may divide the screen into regions or icon image areas that interpret finger motions or taps in different ways, analogous to the special treatment of taps in corner regions 406 and 410 and the special treatment of finger motions in scrolling regions 402 and 404 of FIG. 4. In an illustrative embodiment, each application may choose any of these alternatives, or other alternatives, for its auxiliary screen as best fits the needs of the application.

In the example of FIG. 8A, the touch screen illustrates an auxiliary image for a slide presentation. Slide presentation software, such as Microsoft PowerPoint®, typically uses the entire main display of the computer in full-screen mode to display the current slide. Because the main display may be shown to an audience or linked to a video projector, the main display must show only the slide image itself. The touch screen displays an auxiliary image 800 with information useful to the presenter. Region 802 displays the slide number, title, and speaker's notes. Region 804 displays the title or preview image of the next slide, and region 806 similarly displays the previous slide in the presentation. Regions 804 and 806 are finger-tappable buttons to advance the presentation forward or backward by one slide. Region 802 is configured so that a finger tap brings up a menu of additional presentation options; in one example presentation software system, tapping on region 802 would simulate a right mouse button click. The slide presentation software would be configured to display auxiliary image 800 only during a full-screen presentation. At other times, the software would allow the touch screen to revert to iconic mode with the touch sensor serving its usual role as a pointing device to operate the software.

Figure 8B:
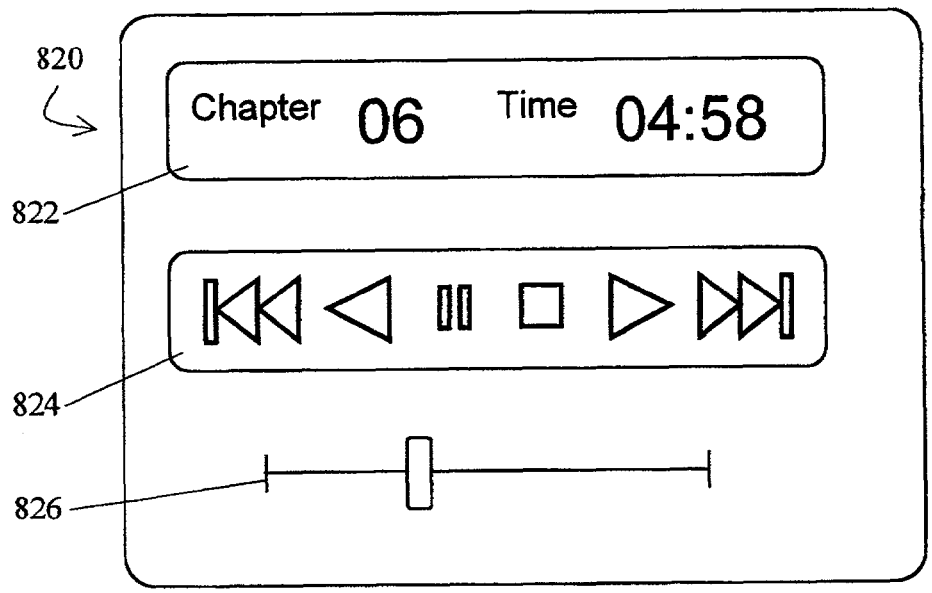

Those skilled in the art will recognize that the slide presentation application of FIG. 8A is representative of a class of applications that can benefit from leaving the entire main display free to display dedicated images. Another example is a software player for DVD movies or videos. DVD players usually include controls such as pause, reverse, fast forward, and chapter select. However, it would be distracting to place these control icons on the main display of the computer when a movie is playing. In the example of FIG. 8B, the DVD player places a small control panel 820 on the touch screen, reserving the entire main display for movie viewing. Control panel 820 includes status icons 822 displaying track information and timing, buttons 824 for operations such as stop and fast forward, and volume control 826. During full-screen movie viewing, buttons 824 and control 826 would respond to touch to control the playing of the movie. When the DVD viewing software is not in full-screen mode, the touch screen could be allowed to revert to normal iconic mode, or control panel 820 could remain on the touch screen display but with buttons 824 and controls 826 active only when the touch screen is in the activated state.

Similarly, many computer systems can play audio from music CD's. Users typically listen to CD's as background music while doing unrelated work on the computer. CD playing software typically displays a control window very similar to that of the DVD software. This window can obstruct the view of the application running on the main display, and would usually be moved to a touch screen display very similar to that of FIG. 8B.

Figure 8C:
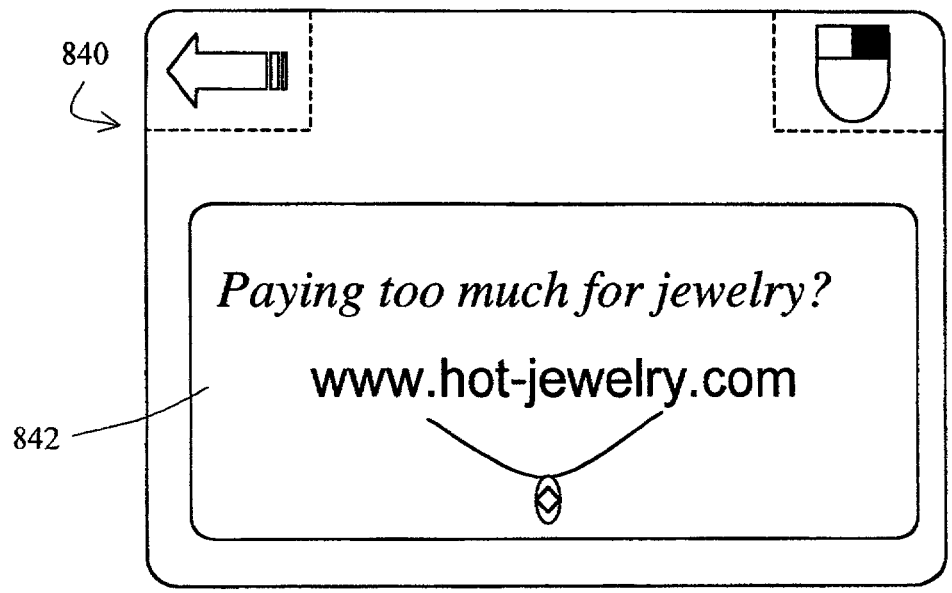

FIG. 8C illustrates another application involving Internet web browsers. Web pages often include advertisements along with the main information of the web page. Some browsers and services offer to filter out the advertisements to reduce visual clutter, but such services encounter great resistance from web providers who depend on advertising revenues. Instead, the browser or service could move the advertisement image onto the touch screen where it remains plainly visible but less obstructive to the main web page. In addition, the touch sensor system could employ a validation mechanism using any of numerous well known digital signature means to allow the display of only those images which the user has allowed or for which the advertiser has paid a licensing fee. In FIG. 8C, image 840 includes advertisement image 842 drawn from an unrelated web page displayed on the main display. In this application, the touch sensor would normally operate as a pointing device, but when the touch screen is in the activated state, tapping on image 842 would instead be interpreted as a click on the advertisement itself.

Figure 8D:
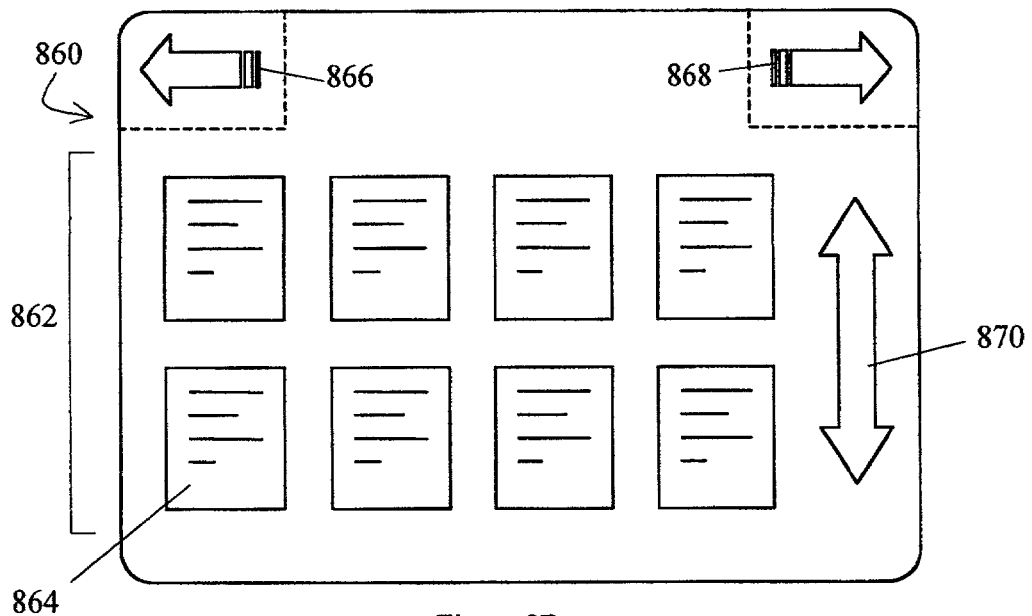

FIG. 8D illustrates yet another potential application involving word processors, such as Microsoft® Word, and document viewers, such as Adobe Acrobat®. These software tools often display auxiliary information such as a table of contents or a set of thumbnail page images to provide context along with the main page or pages on display. This auxiliary information adds clutter and takes up space that could otherwise be devoted to page viewing. In the example of FIG. 8D, auxiliary information 862 has been moved to touch screen 860, leaving more room on the main display for page viewing. Corner tap regions 866 and 868 have been retained but their functions have changed to functions better suited to the document viewing application; region 866 selects the previous page and region 868 selects the next page. Scrolling region 870 has been retained from the default iconic screen, as scrolling is an important function of a document viewer. When the touch screen is in the activated state, tapping on any of thumbnails 864 would cause the page viewer to display the selected page, and scrolling region 870 scrolls thumbnails 864 within area 862 instead of scrolling the document view on the main display.

Another class of applications that can benefit from the touch screen in auxiliary mode is those applications that can benefit from displaying additional or subsidiary information. Many computer operating systems and software applications today provide pop-up help that appears automatically on the screen when the cursor is held still on an icon or button. The pop-up help displays a brief explanation of the icon or button, allowing the user to know ahead of time what will happen if the icon or button is clicked. Pop-up help is usually restricted to brief one-line descriptions, as larger automatic pop-up help windows would obstruct the display. When large unsolicited on-screen help displays have been attempted, as in Microsoft's animated paperclip assistant, users have often found the help feature to be more distracting and obstructive than useful.

According to the present invention, applications can display more extensive pop-up help or other explanatory or subsidiary information on the touch screen when the cursor covers an icon or button on the main display. Because touch screen help text does not obscure anything on the main display, it can be quite extensive, and it can appear immediately without waiting for the cursor to hold still over the icon for a period of time. Touch screen help can also be offered for user interface elements that normally are not well suited to pop-up help for visual design reasons, such as the selections within pull-down menus.

Figure 9:
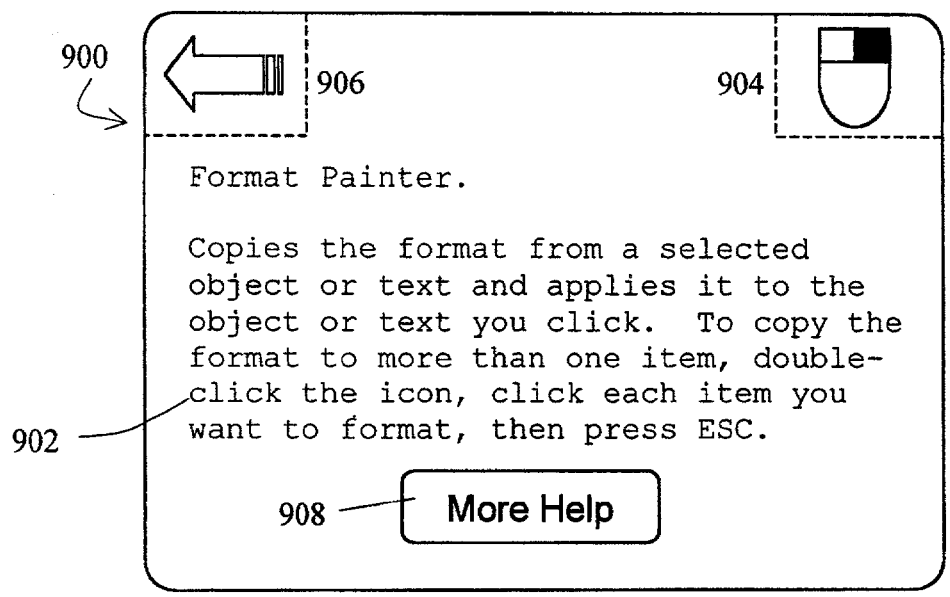
FIG. 9 is a diagram showing an example use of the touch screen to display subsidiary help text.

FIG. 9 illustrates an example of subsidiary help text on the touch screen of the present invention. When the cursor covers a user interface element on the main display for which help is available, the normal iconic or auxiliary screen image is replaced by a new auxiliary image 900 that persists as long as the cursor remains on the element on the main display. Image 900 includes help text 902 describing the object, in this case the "Format Painter" toolbar icon or menu item of a document preparation tool. Because the user will not necessarily notice that the standard iconic touch screen image has been replaced, permanently active touch regions such as corner tap regions 904 and 906 should be carried over from the replaced image. The rest of the touch screen image is free for help text or other subsidiary information. In the example of FIG. 9, a button 908 is also provided that can be tapped to obtain more help. Again, because the user may not be aware that such buttons have appeared, button 908 should usually be sensitive to finger taps only when the touch screen is in the activated state.

Some software applications already include detailed help text for many user interface elements. This help text may be intended for display when the user invokes an explicit context-sensitive help command for the element. In the present invention, this pre-existing detailed help text can be adapted for display on the touch screen as well, possibly with little or no modification to the application software itself.

All of the preceding examples have featured auxiliary screens tied to a particular application. It is also possible for a particular window or dialog within an application to have an associated auxiliary screen. For example, the Open File command in most applications brings up a characteristic dialog window on the main display. This dialog includes a list of files and directories, a space for typing in a file name, and various buttons for navigating the file system. In many cases, the software application calls on the underlying operating system to supply a standardized dialog for choosing a file. An application, or the operating system itself, could supply an auxiliary screen image with additional buttons, controls, or displays to help the user select a file.

Some dialogs must interact with the main display image of an application. For example, the text find and replace dialog of a word processor typically must stay open as the user calls for repeated searches and replacements in the document, but the dialog tends to get in the way of the view of the document being searched. Word processors employ elaborate heuristics to try to keep the dialog box and the focus of attention within the document out of each others' way.

Figure 10A:
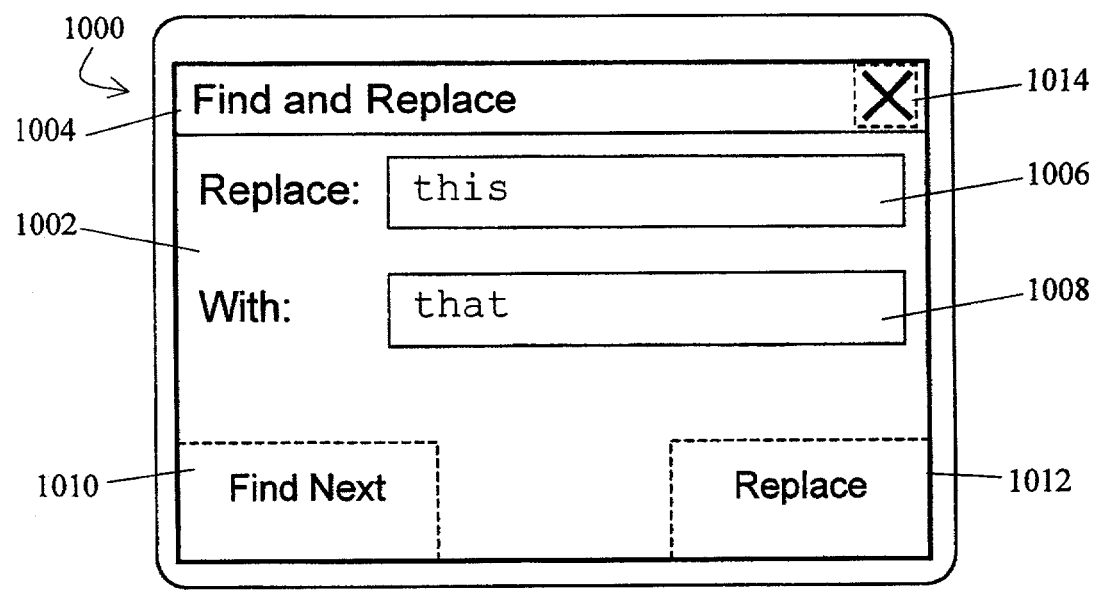
FIG. 10A is a diagram illustrating employment of the touch screen to display a find/replace dialog on the touch screen, leaving the main display free to display a document unobstructed.

FIG. 10A illustrates a better solution employing the touch screen of the present invention. The find/replace dialog 1002 is displayed on touch screen 1000, leaving the main display free to display the document unobstructed. To aid user understanding, dialog 1002 is designed to resemble a conventional dialog box with title bar 1004, text entry areas 1006 and 1008, functional buttons 1010 and 1012, and close button 1014. However, some of the conventional dialog elements have been adapted to best suit the touch screen interface. Functional buttons 1010 and 1012 are located in the corners of the touch screen surface so that they can be made active even when the touch screen is not in the overall activated state. If buttons 1010 and 1012 were drawn in the conventional way, similar to button 908 of FIG. 9, then it would be too confusing to the user for buttons 1010 and 1012 to be sensitive to taps except when the touch screen is in the activated state. Similarly, close button 1014 is located near the corner of screen 1000 so that it can safely be made active at all times. Text entry areas 1006 and 1008 would be filled in by the user at the beginning of the search operation, and would then normally be inactive; tapping on them when the touch screen is in the activated state could allow the search or replace text to be changed. Because text entry on a dialog box is easier to understand on the main display, it may be advantageous for dialog 1002 to appear on the main display during entry of text into areas 1006 and 1008, and then to move to touch screen 1000 during the repeated search operation. In addition or alternatively, a user command, such as a gesture could be provided to move any dialog between the main display and the touch screen at the user's discretion.

Similarly, many applications display "alert" dialogs, typically appearing at unexpected times with brief text messages, to alert the user of errors or other irregular events. Alert dialogs can confusingly obstruct the view of the very operation that caused the alert, and are another good candidate for moving to the touch screen. Applications often call on standard operating system services to display alert dialogs, so the task of moving alerts to the touch screen can be accomplished in the operating system without the cooperation of individual software applications.

Figure 10B:
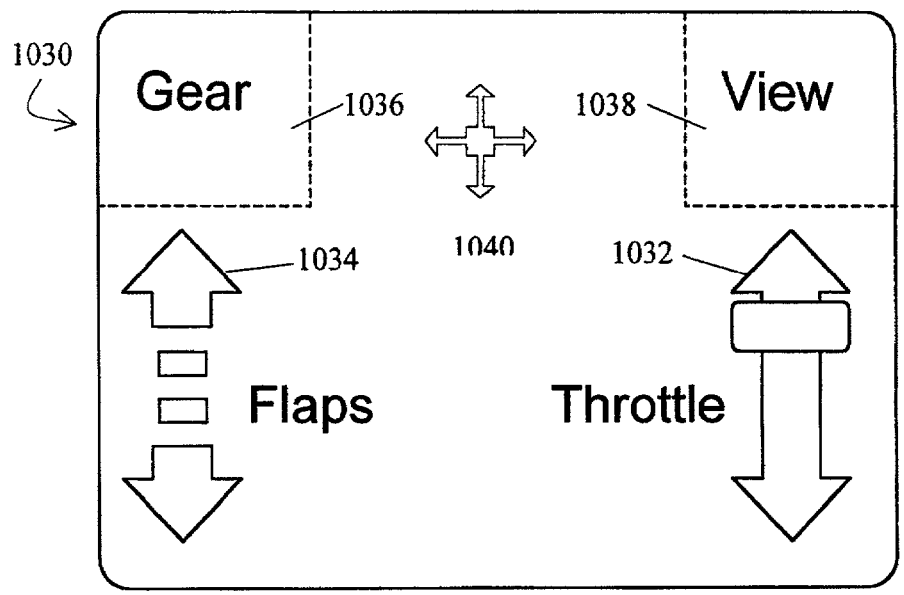
FIG. 10B is a diagram illustrating use of the touch screen to act as a joystick emulator while displaying the control layout established by the game, leaving the main display free to display game graphics unobstructed.

FIG. 10B illustrates yet another application of a touch screen. Many computer games use the mouse as a game controller device in lieu of joysticks or other specialized game controller hardware. A touch pad emulating a mouse serves as a passable game controller, but often the touch pad can be made into a superior game controller by adjusting its behavior to best fit a particular game. Experiments with touch pads have shown that a touch pad reprogrammed in this way can be an excellent game controller, equaling or exceeding the performance of some dedicated game controllers. However, with conventional touch pads it has been too confusing to invisibly redefine the behavior of the touch pad for each game. As shown in FIG. 10B, the touch screen of the present invention solves this problem by displaying the control layout established by the game. In this example, a flight simulator displays an image 1030 including regions 1032 and 1034 similar to conventional scroll regions to control the throttle and flaps, and tap regions 1036 and 1038 to control the landing gear and change the view presented on the main display. Each of these controls is clearly marked by text or symbols on the touch screen to help the user learn the controls.

To be effective game controls, regions 1032, 1034, 1036, and 1038 must be sensitive to touch at all times, without requiring the touch screen to be in an activated state. The remaining area of screen 1030 may be used for normal cursor motion. If screen 1030 includes many game controls, there may be insufficient area remaining to support cursor motion. Depending on the game being controlled, it may or may not be acceptable to omit the cursor motion function. If cursor motion is required, one solution is to invert the sense of activation so that the touch screen operates as a normal pointing device only when it is in the activated state. Another solution is to provide a small cursor control region, such as region 1040, that operates on different principles from a regular touch pad. Region 1040 could serve as a relative cursor motion device, where placing the finger in the region and then rocking the finger a small distance in any direction causes steady cursor motion in the indicated direction. These or similar mechanisms could be used in any auxiliary or pop-up screen that must support cursor motion despite using most of the screen area for other functions.

Figure 10C:
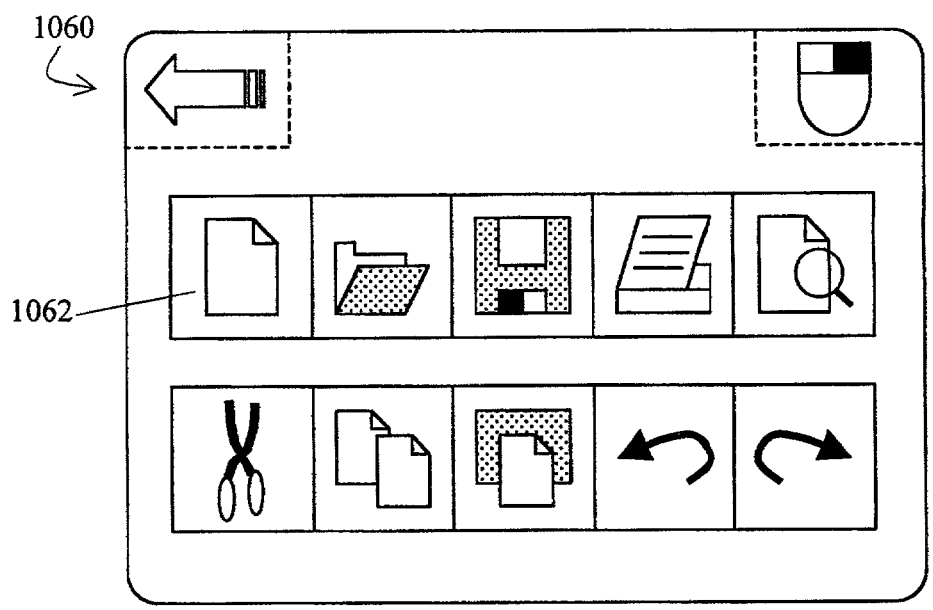
FIG. 10C is a diagram illustrating an example in which a touch screen image includes icons drawn from a typical toolbar, leaving the main display free to display document or an image unobstructed.

Many software applications provide drop-down menus or toolbars on the main display to invoke various operations and commands of the application. Another beneficial use of the touch screen of the present invention is to move or duplicate some or all of these menus and toolbars onto the touch screen. FIG. 10C illustrates an example in which image 1060 includes icons 1062 drawn from a typical toolbar. By activating the touch screen and tapping any of these icons, the user can invoke the corresponding function in the software application. Because these icons would appear in the same relative location on the touch screen every time the application is used, the user can learn their locations by feel and thus avoid the distracting task of moving the cursor away from the natural focus of attention and onto the menu or toolbar. Displaying toolbar icons 1062 on the touch screen allows the user to locate the icons in the learning phase, before the locations of the icons are known by feel.

Those practiced in the art will see that many other types of applications can make use of auxiliary displays and controls on the touch screen. For example, spelling and grammar checking software could display lists of correction choices without obstructing the text being reviewed. The set of examples disclosed and illustrated here in no way limits the scope of applications that can benefit from an auxiliary touch screen according to the present invention.

Figure 11:
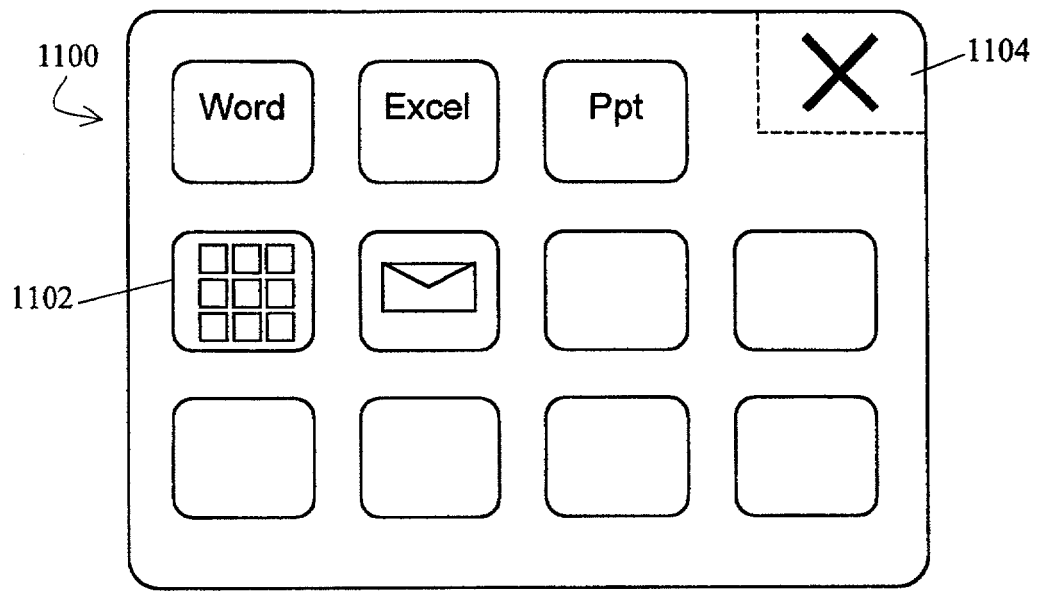
FIG. 11 is a diagram illustrating a pop-up image including various icons representing commonly used tools and software applications on the computer.

FIG. 11 illustrates an example of a third "pop-up" general usage mode of the touch screen of the present invention. In the pop-up mode, the touch screen displays a special image much as in the auxiliary mode. The pop-up mode allows all the same display elements on the touch screen and all the same alternative interpretations of finger actions on the touch sensor as in the auxiliary mode. However, the pop-up image appears in response to a user command or other event in the host computer and is not associated with any particular software application on the main display.

In the example of FIG. 11, the pop-up image is an application launcher. When the application launcher is invoked, image 1100 replaces the previous image on the touch screen. Image 1100 includes various icons 1102 representing commonly used tools and software applications on the computer. The set of applications shown may be predetermined or may be chosen by the user. When the user taps the finger on one of icons 1102, image 1100 disappears and is replaced by the original touch screen image, and the selected application software is launched. Typically, this application would be a conventional software application such as a word processor running on the main display of the computer, but some of icons 1102 may represent system commands (such as shutting down the computer), other tools (such as another pop-up application on the touch screen), or links to additional application launcher screens. The user can also tap on icon 1104 to exit the application launcher screen without invoking any application.

Pop-up screens such as the application launcher of FIG. 11 may be invoked by any of various well-known means for invoking applications, such as a keyboard key, an icon like icon 420 or corner tap region like region 410 of FIG. 4, or the "Start" menu of Microsoft Windows®.

Pop-up screens may be implemented as regular applications as viewed by the operating system; in this case, the application would not create a visible window on the main display, but it would create a touch screen image using the same mechanisms that other applications would use to create an auxiliary touch screen image. In an alternate embodiment, pop-up screens like that of FIG. 11 could be implemented specially within the touch screen driver software, or they could be implemented in the touch screen controller hardware such as controller 216 of FIG. 2.

Figure 12:
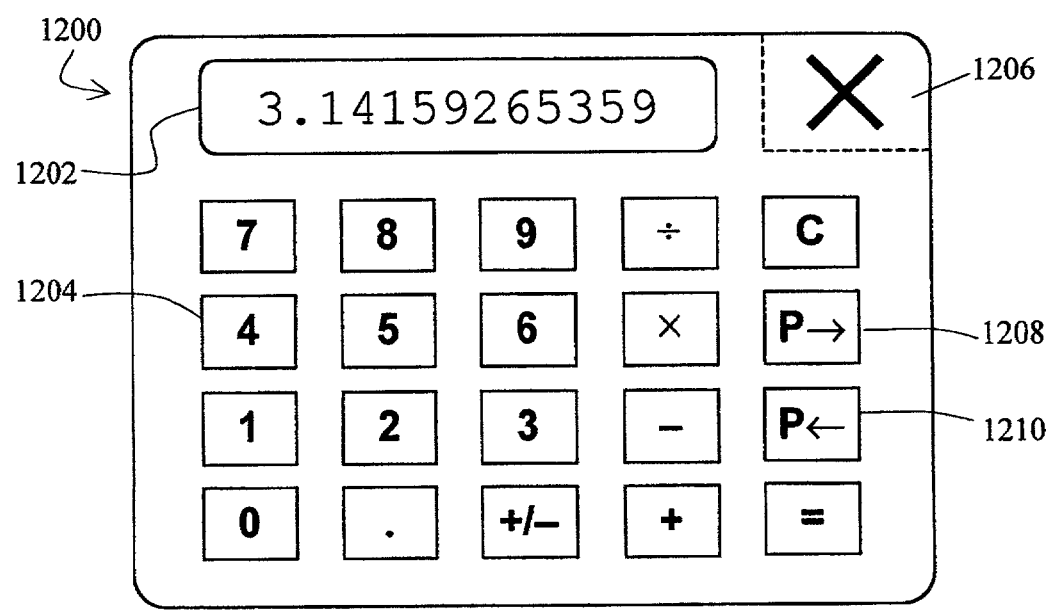
FIG. 12 is a diagram illustrating a pop-up calculator application that operates entirely within the touch screen.

FIG. 12 illustrates a pop-up calculator application that operates entirely within the touch screen. Image 1200 includes the familiar numeric display 1202 and a matrix of buttons 1204 of a calculator. The user taps on the button icons to operate the calculator in the usual fashion. The user taps on button 1206 to close the calculator and restore the touch screen to its previous image. The calculator operates autonomously with respect to the applications visible on the main display of the computer. This autonomous behavior is particularly valuable when the calculator is being used in tandem with an application on the main display, such as a database application looking up numeric data. In the example of FIG. 12, buttons 1208 and 1210 are provided to allow numbers to be pasted back and forth between the calculator and the active application on the main display.

Computer keyboards traditionally include a numeric keypad, but portable computer keyboards rarely have room for a conventional keypad. Portable computer system designers are forced to adopt awkward solutions such as the "Fn" key. A pop-up numeric keypad screen very similar to the calculator of FIG. 12 could serve the role of the numeric keypad in a portable computer. This keypad screen could be invoked by the "NumLock" key already provided on computer keyboards for activating the numeric keypad.

Figure 13A:
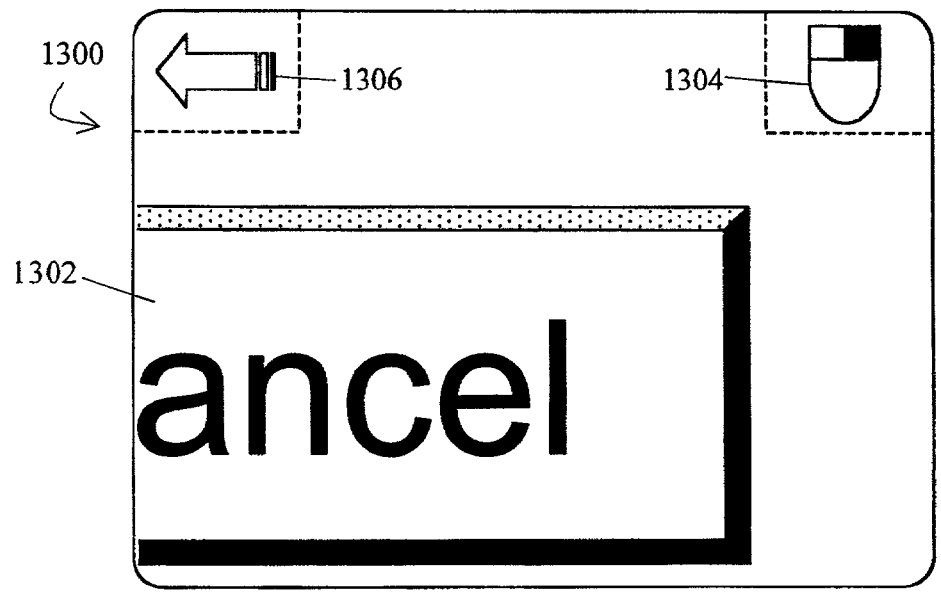
FIGS. 13A and 13B are diagrams illustrating different features of a magnifier as a pop-up image on a touch screen, leaving the main display undisturbed.
Figure 13B:
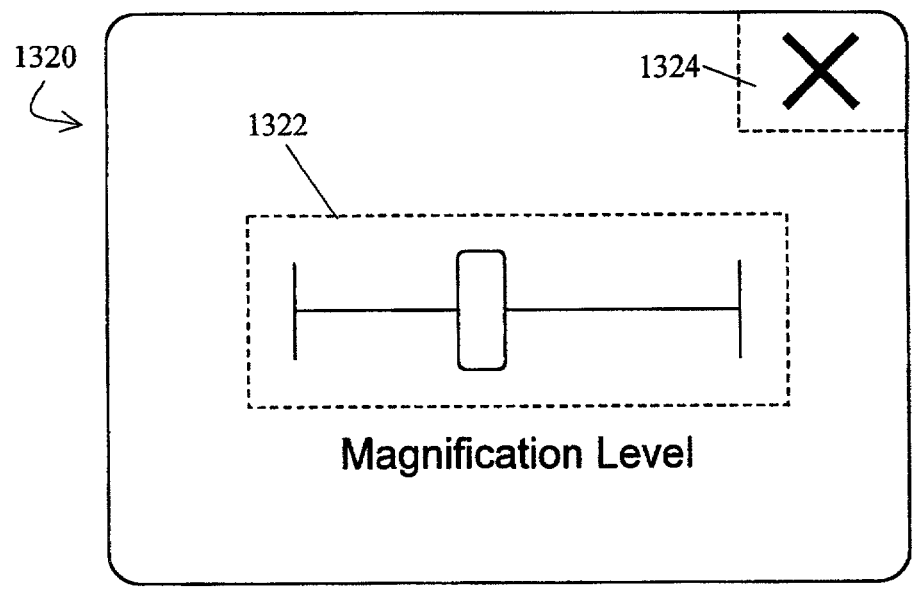

Many computer operating systems provide a magnification tool to assist the visually impaired. This tool typically creates a window on the main screen that displays a magnified copy of the display image surrounding the cursor. This magnifier window can obstruct useful information on the main display. According to the present invention, as illustrated in FIG. 13A, the magnifier can instead take the form of a pop-up image 1302 on touch screen 1300, leaving the main display undisturbed. Unlike the examples of FIGS. 11 and 12, the magnifier pop-up would probably be left displayed much of the time that the computer is used. This pop-up application would therefore leave the touch sensor operating as a conventional pointing device; hence, corner tap regions 1304 and 1306 are retained. When the touch screen is in the activated state, the magnifier application can offer additional accessibility features on the touch screen. In the example of FIG. 13B, in the activated state, touch screen 1320 replaces image 1302 with an image of controls such as magnification level adjustment 1322. Also, close box 1324 appears in the activated state to allow the user to turn off the magnification feature. In an alternate embodiment, in the activated state, the magnifier activates features to assist operation of small on-screen controls.

In an alternative magnification mode, the main display image is reduced and moved to the touch screen display, and then a magnified view of a portion of the image is shown on the main display. This has the advantage that the main display is larger and likely to have greater clarity and color depth than the touch screen, and will thus be a better detail viewing device for the visually impaired.

Figure 13C:
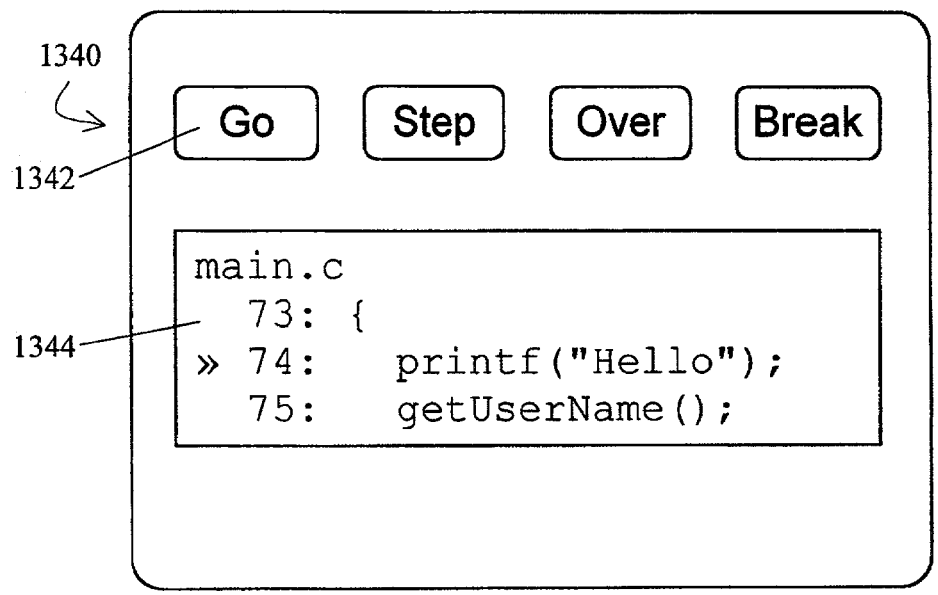
FIG. 13C is a diagram illustrating a debugger implemented as a pop-up application on a touch screen, providing a secondary debugging display with no extra cost or bulk.

Debugging is a task that greatly benefits from a secondary display. Computer programmers today sometimes attach a second display monitor to their computers so that the program under debugging can operate undisturbed on the first display monitor. These second displays are costly and inconvenient, particularly on portable computers. As shown in FIG. 13C, a debugger could be implemented instead as a pop-up application on the touch screen of the present invention, providing the benefits of a secondary debugging display with no extra cost or bulk. In the example of FIG. 13C, image 1340 includes command buttons 1342 and source code display window 1344.

Users of ideographic languages like Chinese and Japanese typically rely on input methods beyond the simple direct keystroke mapping used in Western languages. A variety of input methods are in use for ideographic languages, many of which require or benefit greatly from providing visual feedback to the user through a special window. This window can obstruct the application for which the input is intended. According to the present invention, the input method dialog can be implemented as a pop-up image on the touch screen. One popular input method is handwriting recognition, in which case the touch screen can also serve as the handwriting input device for added benefit.

Figure 14:
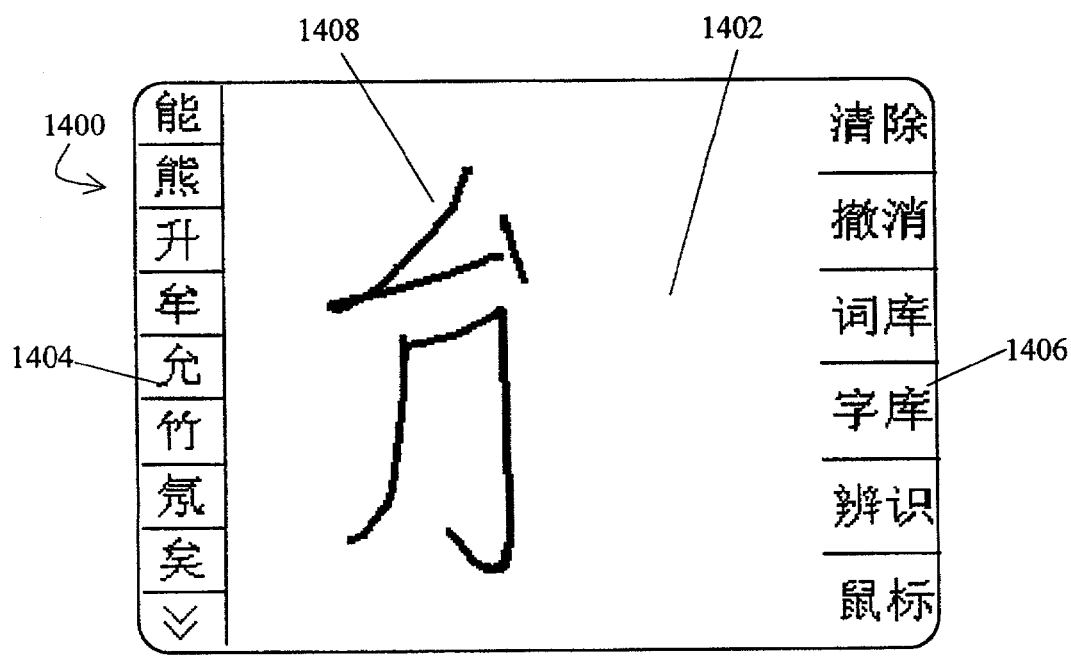
FIG. 14 is a diagram illustrating an example of an ideographic handwriting entry system on a touch screen in which a handwriting entry area responds to finger touch to enter an ideographic character.

FIG. 14 illustrates an example Chinese handwriting entry system on touch screen 1400. Handwriting entry area 1402 responds to finger touch to enter a Chinese character. In this application, the touch screen sensing technology advantageously senses pens as well as fingers; although handwriting with fingers has been shown to work quite well, many users prefer to write with a pen. Pen or finger motions in area 1402 can leave an "ink" trail 1408 on the touch screen display to allow the user to see the character as it is being drawn. Once a character is drawn in area 1402, the software attempts to recognize it as a valid Chinese character. The software creates an ordered list of possible matches, which are displayed in area 1404. The user can touch one of the match characters in area 1404 to "type" the selected character into the application running on the main display. Area 1406 contains touch-sensitive buttons to control the character recognition software in various ways.

Handwriting with "inking" is also useful in applications such as signature capture, signature recognition, and sketching, all of which are enhanced by the touch screen of the present invention.

Another useful class of pop-up screen applications is in the area of security. Portable computers are especially vulnerable to theft, so many portable computers include some kind of password or biometric interlock. For maximum effectiveness, the interlock should validate the user's identity before the main processor of the computer is even allowed to run. Because the main display is operated by the main processor of the computer, the security interlock would need to use alternate output mechanisms to interact with the user. The touch screen of the present invention provides an excellent user interface device for a security interlock. The software that manages the interlock can be implemented in the touch screen controller itself, or in another peripheral controller within the computer. This implementation fits well with the architecture of many portable computers today, where a peripheral controller is already present in between the main processor and the touch pad, and this peripheral controller is also already tasked with power management and system reset control for the main processor.

Figure 15A:
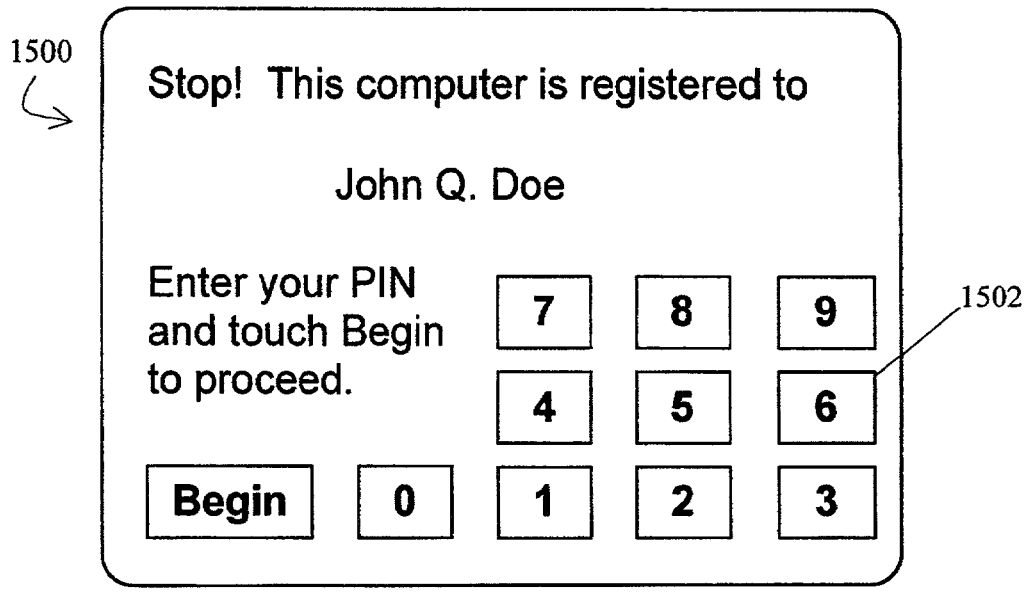
FIG. 15A is a diagram illustrating use of a touch screen as a user interface device for a computer security interlock.

FIG. 15A illustrates a pop-up screen 1500 that appears when the computer system is first switched on. The user must enter a correct personal identification number (PIN) on keypad icons 1502 before the main computer processor will operate. In an alternate embodiment, the user enters a signature on the touch screen or uses some other mechanism such as a smart card or fingerprint to authenticate himself or herself to the system.

Figure 15B:
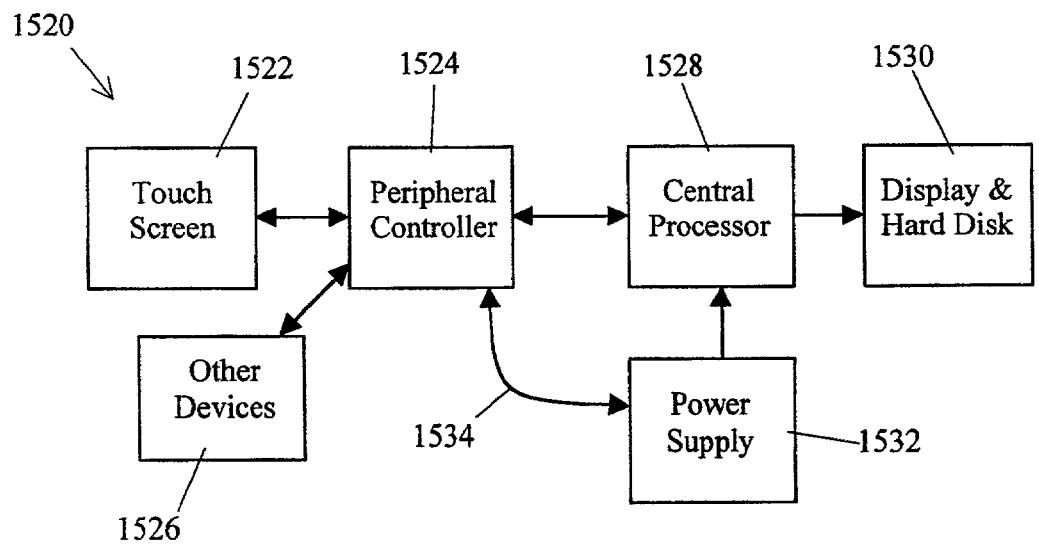
FIG. 15B is a diagram illustrating an exemplary hardware architecture for implementing the computer security interlock of FIG. 15A.

FIG. 15B illustrates an exemplary hardware architecture implementing the security interlock of FIG. 15A. Computer system 1520 includes touch screen module 1522, which in turn contains the hardware and control circuitry illustrated in FIG. 2. Touch screen 1522 communicates to peripheral controller 1524. Controller 1524 also manages other peripherals 1526 such as keyboards, external pointing devices, and optional biometric authentication devices. During operation of the computer, controller 1524 serves as a conduit between touch screen 1522 and central processor 1528. Central processor 1528 in turn operates other devices 1530 such as the main display and hard drive. Power supply 1532 powers central processor 1528 as well as all other components of the system. At system start-up, power supply 1532 withholds power from processor 1528 until it receives a signal from controller 1524 by direct connection 1534 stating that the user has been authenticated and system start-up can proceed. Alternatively, controller 1524 holds processor 1528 in reset, or it simply withholds access to the keyboard, touch sensor, and other user interface peripherals, hence rendering the computer system useless until the user is authenticated. In yet another alternative, controller 1524 could participate in higher-level security functions such as delivering a decryption key for data stored on a hard disk.

The security interlock of FIG. 15A and the debugging screen disclosed previously are examples of the general class of applications that use the touch screen to communicate with the user when the rest of the computer system is indisposed due to special circumstances. Another example of this class would be the reporting of information about hardware failures in vital system devices such as the keyboard and the hardware of the main display.

Many other applications of pop-up screens are supported by the touch screen of the present invention. For example, pop-up games could be implemented entirely on the touch screen, leaving the main display unobstructed.

Referring back to FIG. 2, touch screen assembly 200 may advantageously include a backlight 206 or an equivalent. Backlights draw more power than the other components that make up a touch screen, so it is advantageous to switch the backlight off when it is not needed. In an illustrative embodiment, backlight controller 212 is capable of dimming or extinguishing the backlight at the request of controller 216 or host computer 214. Controller 216 and host computer 214 may use heuristics to switch the backlight on and off without explicit direction by the user. For example, the backlight could be switched on if an application installs an auxiliary screen image that replaces the default iconic image, and then switched off if the touch screen goes a certain amount of time without being used. Similarly, the backlight could be switched on whenever the touch screen is in the activated state.

Switching on the backlight when the touch screen is activated has the added benefit of reminding the user that the behavior of the touch screen has changed. The backlight can serve more generally as an attention mechanism for software applications and for the operating system. For example, the backlight can be flashed on or off to notify the user of the arrival of new e-mail or of an impending appointment. Many computer operating systems use sounds to alert the user of a variety of errors and events, but portable computers are sometimes used in public places where the sound must be turned off. The backlight can serve as a replacement alert in this situation. This feature is especially useful when alert dialogs are moved onto the touch screen from the main screen as disclosed in relation to FIG. 10A. Alert dialogs obstruct the view of the application data or interaction that may have raised the alert; by moving the alert to the touch screen and calling the user's attention to it by flashing the backlight, the present invention can improve the effectiveness of alert dialogs throughout the operating system.

If display 204 is a color display, then the system can flash backlight 206, or color display 204 itself, in different colors to signal different types of alerts to the user. In this alternative, the use of color is analogous to the use of different sounds for audible alerts, and the touch screen may implement a mapping from standard sounds supplied by the operating system to standard color alerts.

Conversely, in some systems backlight 206 may be omitted to save space, power, or cost. On such systems, an alternate attention mechanism may be provided to alert the user when the touch screen is activated or changed to a new image with different active buttons. Suitable attention mechanisms include audible alerts, an icon or special cursor shape on the main display of the computer, an LED mounted near the touch screen, or a tactile feedback mechanism integrated with the touch screen.

The touch screen of the present invention must provide a mechanism for application software running on touch screen controller 216 or host computer 214 to create icons such as those shown on the iconic screen of FIG. 4 and to create auxiliary and pop-up images such as those shown in FIGS. 8-15. Various mechanisms are possible to accomplish this.

If the software that manages an icon or pop-up screen resides in touch screen controller 216, then the software has direct access to touch sensor 202 and display 204 via controllers 208 and 210. The software on controller 216 can interpose its own images into the sequence of images it receives from host 214 for display. The software on controller 216 can also intercept finger touch information from sensor 202 before sending this information to host 214. By these means, icons and pop-up screens can be implemented by software entirely in controller 216 with no participation by host 214. Depending on the nature of interface 218, controller 216 may also be able to send keystroke information to host 214 to allow its icons and pop-up screens to control host 214 by simulated keystrokes.

In an illustrative embodiment, many icons, auxiliary screens, and pop-up screens are implemented by various software applications running on host 214. To coordinate access to the touch screen by these various applications, host 214 includes driver software that serves as a conduit between software applications and touch screen controller 216.

Figure 16:
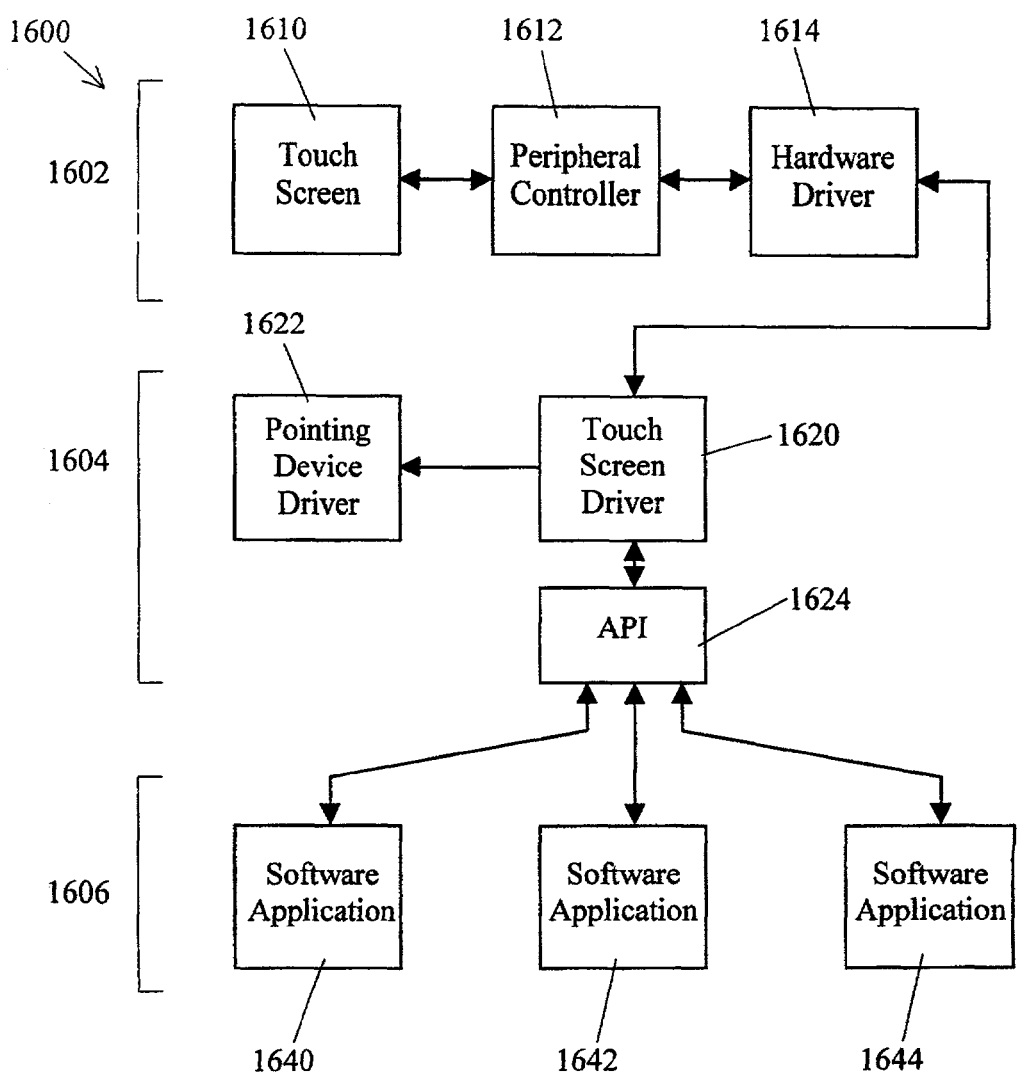
FIG. 16 is a diagram illustrating an exemplary software architecture for a touch screen.

FIG. 16 illustrates an exemplary software architecture for the touch screen of the present invention. Touch screen architecture 1600 consists of hardware layer 1602, driver layer 1604, and application layer 1606. Those skilled in the art will recognize that many other software architectures are equally able to implement the user interface enhancements disclosed herein.

Hardware layer 1602 includes touch screen module 1610, which in turn includes touch screen controller 216 of FIG. 2. Touch screen module 1610 connects to peripheral controller 1612, which is included in host computer 214 of FIG. 2. Peripheral controller 1612 would be a USB host controller subsystem in the case that the USB protocol is used. Peripheral controller 1612 is operated by hardware driver 1614. Hardware driver 1614 is supplied by the operating system of the computer and is not particular to the present invention.

Driver layer 1604 includes touch screen driver 1620, which communicates with hardware driver 1614 to operate the touch screen hardware. Touch screen driver 1620 communicates with pointing device driver 1622. Pointing device driver 1622 is supplied by the operating system and is responsible for operating mice and other pointing devices. When the touch sensor is operating as a conventional pointing device, touch screen driver 1620 converts sequences of finger positions reported by touch screen 1610 into motion signals similar to those produced by a mouse. Touch screen driver 1620 also examines the finger presence indication from touch screen 1610 to recognize finger tapping gestures. U.S. Pat. No. 5,543,591 discloses methods for computing tapping gestures on a touch pad sensor. These motion and gesture signals are conveyed to pointing device driver 1622 to cause cursor motion and clicking compatible with a mouse or conventional touch pad.

Touch screen driver 1620 also operates application programming interface (API) layer 1624. Software applications running on the computer, represented in FIG. 16 by software applications 1640, 1642, and 1644 in application layer 1606, can use API 1624 to obtain special access to the touch screen. API 1624 exports a variety of touch pad and touch screen commands to the applications in application layer 1606. These commands include requests for information about finger and "mouse" button activities on the touch sensor, as well as requests to override the cursor motion normally conveyed to pointing device driver 1622 with different cursor motion generated by the application based on finger movements. The API commands also include requests to display or update an icon on the iconic screen image, or to display or update a full-screen auxiliary or pop-up image.

Touch screen driver 1620 is responsible for deciding among conflicting API requests. For example, touch screen driver 1620 may consult pointing device driver 1622 or other operating system components to determine at all times which application, application window, or dialog has the input focus. If applications 1640 and 1642 each post a request to display an auxiliary screen image, it may be advantageous to have driver 1620 send the auxiliary image of application 1640 to touch screen 1610 only when application 1640 has the input focus. Similarly, driver 1620 sends the auxiliary image of application 1642 to the touch screen only when application 1642 has the input focus. If application 1644 has not posted an auxiliary image, then when application 1644 has the input focus, driver 1620 may displays a default iconic screen image similar to that of FIG. 4.

When the user touches the touch sensor, driver 1620 forwards the finger touch information to the application with the input focus if that application has posted an auxiliary screen image that overrides the default finger motion behavior. Similarly, driver 1620 forwards finger tapping information to the application with the input focus if the application has posted an auxiliary screen image that overrides the default finger tapping behavior.

Driver 1620 also monitors the keyboard, touch screen, or other devices to implement the various touch screen activation mechanisms disclosed in relation to FIGS. 6A and 6B. If the auxiliary screen of an application is displayed, the driver conveys the activation state to the application to allow the application to interpret finger motions and taps correctly. If the default iconic screen is displayed, the driver uses the activation state to decide whether to forward motion or tapping information about the icon under the cursor to the application that posted the icon.

Pop-up screens may be created using similar means to auxiliary screens. However, for pop-up screens, driver 1620 may advantageously maintain a concept of touch screen pop-up focus distinct from the input focus maintained by the operating system for applications on the main display. Driver 1620 must use some reasonable rule to coordinate between multiple requests for auxiliary and pop-up images.

Driver 1620 may implement some icons, auxiliary screens, and pop-up screens entirely within the driver itself. The driver may include a mechanism for associating auxiliary screens with pre-existing applications that do not recognize API 1624. For example, if a known pre-existing presentation software application has the input focus, the driver could supply an auxiliary screen like that of FIG. 8A. Driver 1620 would interpret taps in the special icons of FIG. 8A by sending corresponding signals known to be recognized by the software application, such as simulated keystrokes or mouse clicks. Driver 1620 may also implement a mechanism to allow users to associate special icons or auxiliary screens with pre-existing applications. One such mechanism is a scripting language including commands to display images and icons and to change the interpretation of finger actions; scripts in such a language could be written and associated with a software application without modification to the application itself. Another such mechanism is a graphical control panel similar to the resource editors present in many interactive programming environments.

Driver 1620 may support a software control panel to allow the user to customize the operation of the touch screen. This control panel can include controls to choose, enable, disable, and rearrange the various icons on the default iconic screen. This control panel can also include controls to choose which touch screen activation mechanism(s) to use, and which auxiliary and pop-up images to allow access to the screen.

Driver 1620 may allow combinations of iconic, auxiliary and pop-up images on the touch screen. For example, driver 1620 could implement a concept of overlapping windows on the touch screen whereby an auxiliary screen could overlap part of but not all of the iconic screen image it replaces. One possible implementation of this approach is to use the existing display driver architecture of the operating system to manage the display of the touch screen. In the most general case, the touch screen would be viewed as a second display monitor by the operating system, and applications could open windows and dialogs on this display just as they would on the main display.

In an alternate embodiment, the touch screen would be treated distinctly from the main display. Applications would be forbidden from opening windows on the touch screen or operating the touch screen by means other than API 1624. This approach is less flexible but more appropriate, as the small size of the touch screen causes it to behave in the computer/human interface as a different class of device than main displays, even though the touch screen and main display might both be implemented by similar raster LCD technology.

While the present invention has been described with reference exemplary embodiments, it will be understood by those skilled in the art that various changes may be made and equivalents may be substituted for elements thereof without departing from the scope of the present invention. In addition, many modifications may be made to adapt a particular situation or material to the teachings without departing from the essential scope thereof. Therefore, it is intended that the present invention not be limited to the particular embodiment disclosed as the best mode contemplated for carrying out this present invention, but that the present invention will include all embodiments falling within the scope of the appended claims.

What is claimed is:

1. An integrated display and touch screen control system for a portable computer of the type which includes a host central processing unit (CPU), a display screen, and a touch sensor having a sensing region overlaying the display screen, the integrated control system comprising:
    a touch sensor controller configured to operate the touch sensor to sense user input at the display screen;
    a display controller configured to operate the display screen to display images; and
    a central display and touch screen controller configured to control communication between the host CPU and each of the display controller and touch sensor controller;
    wherein the integrated display and touch screen control system is configured to:
        receive a sequence of images from the host CPU for display on the display screen;
        interpose an image, without further participation from the host CPU, into the sequence of images in response to user input sensed by the touch sensor; and
        cause the sequence of images including the interposed image from the touch screen control system to appear on the display screen.

2. The control system of claim 1 wherein the integrated display and touch screen control system is further configured to:
    implement an icon on the display screen in response to the user input, without participation by the host processor.

3. The control system of claim 1 wherein the integrated display and touch screen control system is further configured to:
    implement a pop-up image on the display screen in response to the user input, without participation by the host processor.

4. The control system of claim 3 wherein the integrated display and touch screen control system is further configured to:
    implement an icon image on the display screen in response to the user input, without participation by the host processor.

5. The control system of claim 1 wherein the integrated display and touch screen control system is further configured to:
    send keystroke information to the host processor in response to the user input.

6. The control system of claim 1 wherein the touch sensor comprises a capacitive touch sensor overlaying the display.

7. The control system of claim 1 wherein the touch sensor controller and the display controller are embodied on a single chip.

8. A method of operating an integrated display and touch screen control system for a portable computer of the type comprising a host processor, a display screen, and a touch sensor having a sensing region overlying the display screen wherein the integrated display and touch screen control system is distinct from the host processor, the method comprising:
    receiving a sequence of images from the host processor for display on a display screen of the touch screen device;
    interposing an image, without further participation from the host processor, from the integrated display and touch screen control system into the sequence of images in response to user input sensed by the touch sensor; and causing the sequence of images including the image from the integrated display and touch screen control system to appear on the display.

9. The method of claim 8 wherein the causing the sequence of images with the image from the integrated display and touch screen control system to appear on the display screen comprises:

displaying an icon on the display screen in response to user input at the display screen, without participation by the host processor.

10. The method of claim 8 wherein the causing the sequence of images with the image from the integrated display and touch screen control system to appear on the display screen comprises:

displaying a pop-up image on the display screen in response to user input at the display screen, without participation by the host processor.

11. The method of claim 8 further comprising:

communicating information about user input at the display screen to the host processor.

12. The method of claim 11 wherein the communicating information about the user input at the display screen to the host processor comprises:

sending keystroke information to the host processor in response to user input at the display screen.

13. An integrated display and touch screen control system adapted to be physically integrated in a computing system having a host processor, a display screen, and a touch sensor overlying the display screen, the integrated display and touch screen control system comprising:

a touch sensor controller configured to operate the touch sensor to sense user input at the display screen;

a central touch screen controller configured to receive a sequence of images from the host processor for display on the display screen and interpose an image from the touch screen controller into the sequence of images; and a display screen controller configured to cause the sequence of images including the image from the touch screen controller to appear on the display screen.

14. The integrated display and touch screen control system of claim 13, further configured to:

implement an icon on the display screen in response to the user input, without participation by the host processor.

15. The integrated display and touch screen control system of claim 13, further configured to:

implement a pop-up image on the display screen in response to the user input, without participation by the host processor.

16. The integrated display and touch screen control system of claim 15, further configured to:

implement an icon on the display screen in response to the user input, without participation by the host processor.

17. The integrated display and touch screen control system of claim 13, further configured to:

send keystroke information to the host processor in response to the user input.

18. The integrated display and touch screen control system of claim 13 wherein:

the touch sensor controller comprises a first chip distinct from the host processor; and wherein the display screen controller comprises a second chip distinct from the host processor.

19. The integrated display and touch screen control system of claim 13 wherein the touch sensor controller is configured to operate capacitive sensor elements.

\* \* \* \* \*